United States Patent
Larsson et al.

(10) Patent No.: US 12,134,215 B2
(45) Date of Patent: Nov. 5, 2024

(54) METHOD FOR MANUFACTURING A CELLULOSE PRODUCT, CELLULOSE PRODUCT FORMING APPARATUS AND CELLULOSE PRODUCT

(71) Applicant: PulPac AB, Västra Frölunda (SE)

(72) Inventors: Ove Larsson, Västra Frölunda (SE); Linus Larsson, Gothenburg (SE)

(73) Assignee: PulPac AB, Västra Frölunda (SE)

( * ) Notice: Subject to any disclaimer, the term of this patent is extended or adjusted under 35 U.S.C. 154(b) by 0 days.

(21) Appl. No.: 18/231,018

(22) Filed: Aug. 7, 2023

(65) Prior Publication Data
US 2023/0373136 A1  Nov. 23, 2023

Related U.S. Application Data

(63) Continuation of application No. 17/716,909, filed on Apr. 8, 2022, now Pat. No. 11,766,810, which is a (Continued)

(30) Foreign Application Priority Data

Mar. 18, 2016 (SE) .................... 1630058-4

(51) Int. Cl.
*B29C 43/10* (2006.01)
*B27N 3/04* (2006.01)
(Continued)

(52) U.S. Cl.
CPC ............... *B29C 43/10* (2013.01); *B27N 3/04* (2013.01); *B27N 3/08* (2013.01); *B27N 5/02* (2013.01);
(Continued)

(58) Field of Classification Search
CPC ...................................... B29C 43/10
See application file for complete search history.

(56) References Cited

U.S. PATENT DOCUMENTS 3,114,670 A   12/1963   Iwasaki
3,546,740 A   12/1970   Johnson
(Continued)

FOREIGN PATENT DOCUMENTS

CL   199500343   9/1993
CL   200300817   4/2004
(Continued)

OTHER PUBLICATIONS

International Search Report and Written Opinion for Application No. PCT/SE2017/050254, dated May 24, 2017.
(Continued)

*Primary Examiner* — Larry W Thrower
*Assistant Examiner* — Timothy G Hemingway
(74) *Attorney, Agent, or Firm* — MARSHALL, GERSTEIN & BORUN LLP

(57) ABSTRACT

A method for manufacturing a cellulose product, comprising the steps: dry forming a cellulose blank in a dry forming unit; arranging the cellulose blank in a forming mould; heating the cellulose blank to a forming temperature in the range of 100° C. to 200° C.; and pressing the cellulose blank in the forming mould with a forming pressure of at least 1 MPa.

21 Claims, 15 Drawing Sheets

Related U.S. Application Data continuation of application No. 17/242,833, filed on Apr. 28, 2021, now Pat. No. 11,839,999, which is a continuation of application No. 16/085,466, filed as application No. PCT/SE2017/050255 on Mar. 16, 2017, now Pat. No. 11,020,883.

(51) Int. Cl.

| | | |
|---|---|---|
| B27N 3/08 | (2006.01) | |
| B27N 5/02 | (2006.01) | |
| B29B 13/06 | (2006.01) | |
| B29C 43/00 | (2006.01) | |
| B29C 43/02 | (2006.01) | |
| B29C 43/20 | (2006.01) | |
| B29C 43/36 | (2006.01) | |
| B29C 43/46 | (2006.01) | |
| B29C 43/52 | (2006.01) | |
| B29C 43/58 | (2006.01) | |
| B29C 49/00 | (2006.01) | |
| B29C 49/22 | (2006.01) | |
| B29C 51/00 | (2006.01) | |
| B29C 51/08 | (2006.01) | |
| B29C 51/30 | (2006.01) | |
| B29C 51/42 | (2006.01) | |
| B31B 50/59 | (2017.01) | |
| B65B 43/08 | (2006.01) | |
| D04H 1/732 | (2012.01) | |
| B29C 49/04 | (2006.01) | |
| B29C 49/58 | (2006.01) | |
| B29C 51/16 | (2006.01) | |
| B29K 1/00 | (2006.01) | |
| B29K 311/10 | (2006.01) | |
| B29L 31/00 | (2006.01) | |
| B31B 120/00 | (2017.01) | |

(52) U.S. Cl.
CPC .......... *B29B 13/065* (2013.01); *B29C 43/003* (2013.01); *B29C 43/02* (2013.01); *B29C 43/20* (2013.01); *B29C 43/3642* (2013.01); *B29C 43/46* (2013.01); *B29C 43/52* (2013.01); *B29C 43/58* (2013.01); *B29C 49/0005* (2013.01); *B29C 49/22* (2013.01); *B29C 51/002* (2013.01); *B29C 51/004* (2013.01); *B29C 51/082* (2013.01); *B29C 51/30* (2013.01); *B29C 51/42* (2013.01); *B31B 50/59* (2017.08); *B65B 43/08* (2013.01); *D04H 1/732* (2013.01); *B29C 2043/3647* (2013.01); *B29C 2043/5808* (2013.01); *B29C 49/04* (2013.01); *B29C 49/58* (2013.01); *B29C 51/08* (2013.01); *B29C 51/16* (2013.01); *B29K 2001/00* (2013.01); *B29K 2311/10* (2013.01); *B29L 2031/7158* (2013.01); *B31B 2120/00* (2017.08)

(56) References Cited

U.S. PATENT DOCUMENTS

| | | |
|---|---|---|
| 4,311,555 A | 1/1982 | Reinhall |
| 4,474,846 A | 10/1984 | Doerer et al. |
| 4,640,810 A | 2/1987 | Laursen et al. |
| 4,708,626 A | 11/1987 | Sakai et al. |
| 5,094,791 A | 3/1992 | Nopper |
| 5,302,445 A | 4/1994 | DePetris et al. |
| 5,413,746 A | 5/1995 | Birjukov |
| 5,904,643 A | 5/1999 | Seeberger et al. |
| 6,010,595 A | 1/2000 | Mitchell et al. |
| 6,267,252 B1 | 7/2001 | Amsler |
| 8,545,953 B2 | 10/2013 | Burgdorfer et al. |
| 11,766,810 B2 * | 9/2023 | Larsson .......... D04H 1/732 264/115 |
| 11,839,999 B2 * | 12/2023 | Larsson .......... B29C 49/0005 |
| 2001/0029714 A1 | 10/2001 | Lynch et al. |
| 2002/0012759 A1 | 1/2002 | Asayama et al. |
| 2003/0029591 A1 | 2/2003 | Otani et al. |
| 2004/0045690 A1 | 3/2004 | Eto et al. |
| 2004/0056379 A1 | 3/2004 | Haataja |
| 2004/0265453 A1 | 12/2004 | Helou et al. |
| 2005/0145327 A1 | 7/2005 | Frankefort et al. |
| 2009/0057958 A1 | 3/2009 | Anghileri et al. |
| 2010/0116181 A1 | 5/2010 | Christoffel et al. |
| 2010/0190020 A1 | 7/2010 | Frederiksen et al. |
| 2016/0250785 A1 | 9/2016 | Shimotake et al. |

FOREIGN PATENT DOCUMENTS

| | | |
|---|---|---|
| CN | 2115359 | 9/1992 |
| CN | 1647948 A | 8/2005 |
| CN | 1958946 | 5/2007 |
| CN | 201068210 | 6/2008 |
| CN | 201287979 Y | 8/2009 |
| CO | 95009413 | 3/1995 |
| CO | 04047467 | 5/2004 |
| DE | 1146740 B | 4/1963 |
| DE | 19619463 A1 | 11/1997 |
| EP | 0424909 A2 | 5/1991 |
| EP | 0725851 A1 | 8/1996 |
| EP | 1029978 A2 | 8/2000 |
| EP | 2004377 A1 | 12/2008 |
| EP | 2004517 A1 | 12/2008 |
| EP | 2129705 A1 | 12/2009 |
| EP | 2163378 A1 | 3/2010 |
| EP | 2004517 B1 | 4/2015 |
| GB | 1417826 A | 12/1975 |
| JP | H04166970 A | 6/1992 |
| JP | 2001146699 A | 5/2001 |
| JP | 2001322190 A | 11/2001 |
| JP | 2002509781 A | 4/2002 |
| JP | 2002138397 A | 5/2002 |
| JP | 2002179044 A | 6/2002 |
| JP | 2002201598 A | 7/2002 |
| JP | 2002266299 A | 9/2002 |
| JP | 2003311721 A | 11/2003 |
| JP | 2004346441 A | 12/2004 |
| JP | 2008290691 A | 12/2008 |
| JP | 2012530007 A | 11/2012 |
| JP | 2015203163 | 11/2015 |
| KR | 20020026837 A | 4/2002 |
| RU | 2434746 C2 | 11/2011 |
| SU | 1493706 A1 | 7/1989 |
| WO | WO-86/00097 A1 | 1/1986 |
| WO | WO-199512020 A1 | 5/1995 |
| WO | WO-9856571 A1 | 12/1998 |
| WO | WO-2002042070 A1 | 5/2002 |
| WO | WO-2006002015 A1 | 1/2006 |
| WO | WO-2007104431 A1 | 9/2007 |
| WO | WO-2007113750 A2 | 10/2007 |
| WO | WO-200810693 A1 | 1/2008 |
| WO | WO-2008040821 A2 | 4/2008 |
| WO | WO-2010/000945 A1 | 1/2010 |
| WO | WO-2012139590 A1 | 10/2012 |
| WO | WO-2014142714 A1 | 9/2014 |
| WO | WO-2017160218 A1 | 9/2017 |
| WO | WO-18033208 A1 | 2/2018 |

OTHER PUBLICATIONS

International Preliminary Report on Patentability for Application No. PCT/SE2017/050254, dated Feb. 22, 2018.

Larsson, P.A., Wagberg, L., "Towards natural-fibre-based thermoplastic films produced by conventional papermaking," *Green Chemistry*, pp. 3324-3333 (2016).

Linvill, E., "Development of Finite Element Models for 3-D Forming Processes of Paper and Paperboard," Licentiate Thesis No. 126, *KTH Royal Institute of Technology*, School of Engineering Sciences, Department of Solid Mechanics, pp. 10-11 (2015).

(56) References Cited

OTHER PUBLICATIONS

Larsson, P.A., Berglund, L.A., and Wagberg, L., "Ductile All-Cellulose Nanocomposite Films Fabricated from Core-Shell Structured Cellulose Nanofibrils," *Biomacromolecules*, pp. 2218-2223 (2014).
Nilsson, H., Galland, S., Larsson, P.T., Gamstedt, E.K., Nishino, T., Berglund, L.A., and Iversen, T., "A non-solvent approach for high-stiffness all-cellulose biocomposites based on pure wood cellulose," *Composites Science and Technology*, pp. 1704-1712 (2010).
International Search Report and Written Opinion for Application No. PCT/SE2017/050255, dated May 24, 2017.
International Preliminary Report on Patentability for Application No. PCT/SE2017/050255, dated Feb. 22, 2018.
Thibaud Pintiaux et al. "High Pressure Compression-Molding of α-Cellulose and Effects of Operating Conditions", *Materials*, pp. 2240-2261 (2013).
Extended European Search Report for Application No. EP 17767071.8, dated Oct. 24, 2019.
"Gonzalez, Gilmar y otros.—Cálculo y diseño de un molde de inyección soplado. Corporación Universitaria Autónoma de Occidente. División Ingenierías. Programa de Ingeniería Mecánica." (2010).
"Interempresas.—moldeo por soplado; equipos y accesorios" (1995).
"Tecnologia Y Ciencia.—blog de Tecnología en la enseñanza" (2012).
Office Action in corresponding Colombia patent application No. NC2018/0009542, dated Feb. 17, 2020.
Office Action in corresponding Chilean patent application No. 201802601, dated Mar. 13, 2020.
Office Action in corresponding Chinese patent application No. 201780030539.3, dated Apr. 2, 2020.
Office Action in corresponding Russian patent application No. 2018136582, dated Jun. 10, 2020.
Search Report in corresponding Russian patent application No. 2018136582, dated Jun. 9, 2020.
Decision to Grant in corresponding Russian patent application No. 2018136582, dated Sep. 22, 2020.
Extended European Search Report for Application No. 17767070.0, dated Nov. 26, 2019.
Office Action in Japanese patent application No. 2019-500208, dated Aug. 31, 2020.
Extended European Search Report for Application No. 20175190.6, dated Oct. 6, 2020.
Office Action in corresponding Korean Patent Application No. 10-2018-7029222, mailed Nov. 17, 2020.
Office Action in corresponding Colombia patent application No. NC2018/0009542, dated Nov. 24, 2020.
Office Action in corresponding India patent application No. 201817035709, dated Dec. 16, 2020.
Office Action in corresponding India patent application No. 201817035544, dated Jan. 12, 2021.
Office Action in corresponding Japanese patent application No. 2019-500209, dated Jan. 28, 2021. (English Translation).
Extended European Search Report for Application No. EP 21162661.9, dated Jun. 28, 2021.
Office Action in corresponding Brazilian patent application No. 112018068731, dated Sep. 28, 2021.
Extended European Search Report for Application No. EP 21206500.7, dated Jan. 20, 2022.
Extended European Search Report for Application No. EP 21206499.2, dated Jan. 25, 2022.
Office Action in corresponding Australian patent application No. 2017233234, dated Feb. 9, 2022.
Office Action in corresponding Australian patent application No. 2017233235, dated Feb. 17, 2022.
Office Action in corresponding Brazilian patent application No. BR112018068720, dated Sep. 28, 2021.
Office Action in corresponding Chinese patent application No. 202011163968.8 dated Feb. 28, 2022.
Office Action in corresponding European Patent Application No. 21162661.9 dated Sep. 15, 2022.
Office Action in corresponding Mexican Patent Application No. MX/a/2018/010761 dated Mar. 7, 2023.
Louise Melin, "Development of DuraPulp packaging demonstrator", Masters Thesis, Lund University, Sep. 2015.
Office Action in corresponding Japanese Patent Application No. 2021-143393, dated Jun. 20, 2022.
Office Action in corresponding Japanese Patent Application No. 2022-176490, dated Nov. 10, 2023.
Communication pursuant to Rule 114(2) EPC, Third Party Observation, in corresponding European patent application No. 21162661.9, dated Aug. 28, 2023.
Communication pursuant to Rule 114(2) EPC, Third Party Observation, in corresponding European patent application No. 21206500.7, dated Feb. 23, 2024.
Subhash K. Batra and Behnam Pourdeyhimi, "Introduction to Nonwovens Technology", DEStech Publications, Inc. (2012).
Extended European Search Report for European patent application No. 24158721.1, dated Aug. 13, 2024.

\* cited by examiner

METHOD FOR MANUFACTURING A CELLULOSE PRODUCT, CELLULOSE PRODUCT FORMING APPARATUS AND CELLULOSE PRODUCT

TECHNICAL FIELD

The present disclosure relates to a method of manufacturing a cellulose product from cellulose fibres. The disclosure further relates to a cellulose product forming apparatus and a cellulose product.

BACKGROUND

There are many situations where it is desirable to provide objects made of sustainable materials in flat or essentially non-flat shapes. A flat shape may refer to a generally two-dimensional (2D) shape, such as for example the shape of a sheet material or blank, and essentially non-flat shapes may refer to any suitable three-dimensional (3D) object shape. One such situation relates to the packaging of liquids, dry materials and different types of goods, where the packaging may be made in a three-dimensional shape or formed into a three-dimensional shape from a two-dimensional sheet material.

When for example packaging sensitive goods, such as mechanical high precision items, electronic equipment and other household and hardware items, there is a need for protective packaging in order to avoid damage of the sensitive goods, due to for example mechanical shock, vibrations or compression during transport, storage, or other handling. Such packages typically require a protective insert that has a shape adapted to the goods contained, and thus securely holds the goods in the package. Such inserts are commonly made of expanded polystyrene (EPS), which is a lightweight petroleum derived material and is not regarded as a sustainable material.

A low price material commonly used for packaging inserts is moulded pulp. Moulded pulp has the advantage of being considered as a sustainable packaging material, since it is produced from biomaterials and can be recycled after use. As a consequence moulded pulp has been quickly increasing in popularity for both primary and secondary packaging applications (packaging next to the article and assembly of such packages). Moulded pulp articles are generally formed by immersing a suction mould into a pulp suspension, while suction is applied, whereby a body of pulp is formed with the shape of the desired article by fibre deposition. The suction mould is then withdrawn from the suspension and the suction is generally continued to compact the deposited fibres while exhausting residual liquid.

A common disadvantage with all wet-forming techniques is the need for drying of the moulded product, which is a time and energy consuming step. Another drawback is that strong inter-fibre bonds, often explained as hydrogen bonds, are formed between the fibres in the material, which restrict the flexibility of the material.

Moreover, many modern lean production lines require in-line and on-demand package or component manufacturing, where a wet-forming process is not preferred.

Lately, new fibre-based materials have been developed with the purpose of enabling dry forming of three-dimensional objects. One approach is disclosed in WO 2014/142714 A1, where a dry-laid composite web being an intermediate product for thermoforming of three-dimensionally shaped objects, comprising 40-95 weight percent CTMP fibres, 5-50 weight percent thermoplastic material, and 0-10 weight percent additives, wherein the dry-laid composite web has been impregnated with a dispersion, an emulsion, or a solution containing the thermoplastic material, polymer, and dried, obtaining a density of 50-250 kg/m3, or, if compressed by calendaring 400-1000 kg/m3. According to the disclosure of WO 2014/142714 A1, bonding of the polymer is activated by the higher temperature applied in the thermoforming process and contributes to the final strength of the thermoformed object.

Although the polymer according to the disclosure of WO 2014/142714 A1 may be contributing to the final strength and enabling forming of dry-laid web, such thermoplastic ingredient will erase the sustainable features of the cellulose since the composite will not be recyclable. This disadvantage is applicable even if a renewable and compostable bioplastic, e.g. polylactide (PLA) is used as proposed in WO 2014/142714 A1, since logistics for material recycling is not available.

Recent findings and political decisions, e.g. Paris agreement on global warming 2015, stipulates that the carbon footprint of consumed goods and packages, in so called life cycle analysis (LCA), is highly influenced by the ability to recycle and reuse materials. Even renewable materials like cellulose and PLA must be recycled in order to measure up with multi recycled non-renewable materials like polyethylene terephthalate (PET).

Material recycling is slowly and gradually becoming more and more established in most parts of the world. Europe has the global lead with approximately 30% recycling while United States only has reached 10% and still many development countries has not yet started to recycle. Common for all recycling efforts is a focus on the most frequently used materials such as paper, cardboard, glass, aluminium, steel and PET. These recyclable fractions represent a vast majority of wasted goods and it is not likely that other fractions, like bio-polymers, will be established as public available recycle logistics in a foreseeable future.

The global demand for 3D formed packages, boxes, hangers, bottles, cups, plates, bowls, inserts and covers in renewable and recyclable material with mechanical properties close to plastics, is therefore huge.

In the publication, ISBN 978-91-7501-518-7 (Helena Halonen, October, 2012), one possible approach to use compression moulding of commercial chemical wood pulps processed with only water has been studied. The objective was to study the structural changes during processing and the complexity of relating the mechanical properties of the final bio-composites to the nano-scale structure.

The combination of high temperature (150-170° C.) and high pressure (45 MPa) during compression moulding yields a remarkable increase in fibril aggregation, possibly including cellulose-cellulose fusion bonds, i.e. fibril aggregation in the fibre-fibre bond region. This fibril aggregation is resulting in a bio-composite with remarkable mechanical properties including improved strength (289 MPa), modulus (12.5 GPa) and toughness (6%) to be compared to e.g. PET-strength (75 MPa) and PET-modulus (PET 3 GPa).

Although WO2014142714A1 proposes non-recyclable thermoplastic ingredient and ISBN 978-91-7501-518-7 presents scientific results for forming recyclable cellulose fibres to obtain good mechanical properties, no practical or industrial method has so far been invented enabling commercial production, with reasonable cycle time, of packages and goods in cellulose as replacement for plastics which are possible to recycle as cardboard.

In view of the above-mentioned and other drawbacks of the prior art, it is an object of present invention to provide for cost-efficient and rational production of a cellulose product with improved mechanical properties.

SUMMARY

An object of the present disclosure is to provide a method for manufacturing a cellulose product, a cellulose forming apparatus and a cellulose product where the previously mentioned problems are avoided. This object is at least partly achieved by the features of the independent claims. The dependent claims contain further developments of the method for manufacturing a cellulose product, the cellulose product forming apparatus and the cellulose product.

There are many situations where it is desirable to provide objects made of sustainable materials in flat or essentially non-flat shapes. A flat shape may refer to a generally two-dimensional shape, such as for example the shape of a sheet material or blank, and essentially non-flat shapes may refer to any suitable three-dimensional object shape. One such situation relates to the packaging of liquids, dry materials and different types of goods, where the packaging may be made in a three-dimensional shape or formed into a three-dimensional shape from a two-dimensional sheet material.

The disclosure concerns a method for manufacturing a cellulose product, comprising the steps: dry forming a cellulose blank in a dry forming unit; arranging the cellulose blank in a forming mould; heating the cellulose blank to a forming temperature in the range of 100° C. to 200° C.; and pressing the cellulose blank in the forming mould with a forming pressure of at least 1 MPa.

With dry forming of the cellulose blank is meant a process in which cellulose fibres are air-laid to form the cellulose blank. When forming the cellulose blank in the air-laid process, the cellulose fibres are carried and formed to the blank structure by air as carrying medium. This is different from a normal papermaking process, where water is used as carrying medium for the cellulose fibres when forming the paper structure. In the air-laid process, water or other substances may be added to the cellulose fibres in order to change the properties of the cellulose blank, but air is still used as carrying medium in the forming process.

Advantages with these features are that the cellulose product is manufactured in a dry forming process, where the cellulose blank is dry formed from cellulose fibres in the dry forming unit. By heating and pressing the cellulose blank, cellulose products with good material properties are achieved. The cellulose products may for example be a bottle, a container or a part of a container, where the cellulose product manufactured according to the method may replace plastic products that are more difficult to recycle. Other cellulose products manufactured according to the method may for example be packages, inserts for packages, hangers, boxes, bowls, plates, cups, trays, or covers. When pressing the cellulose fibres with the forming pressure of at least 1 MPa with a forming temperature in the range of 100° C. to 200° C., the cellulose fibres will be bonded to each other in a way so that the resulting cellulose product will have good mechanical properties. Tests have shown that higher forming temperatures will give stronger bonding between the cellulose fibres when being pressed at a specific forming pressure. With forming temperatures above 100° C. together with a forming pressure of at least 1 MPa, the cellulose fibres will be strongly bonded to each other. A higher forming temperature will increase the fibril aggregation, water resistance, Young's modulus and the mechanical properties of the final cellulose product. The high pressure is important for fibril aggregation between the cellulose fibres in the cellulose product. At temperatures higher than 200° C., the cellulose fibres will be thermally degraded and therefore temperatures above 200° C. should be avoided.

According to an aspect of the disclosure, the cellulose blank is formed into a cellulose product having a flat or essentially non-flat shape. In this way, many different types of products can be manufactured, including essentially two-dimensional blanks that may be used for forming three-dimensional products.

According to another aspect of the disclosure, the forming pressure is in the range of 1 MPa to 100 MPa. Within this pressure range, the forming of the cellulose products with desired properties can be achieved, and the pressure level can be adjusted to suit the specific needs of the types of products to be formed.

According to a further aspect of the disclosure, the heating of the cellulose blank at least partly takes place before pressing the cellulose blank. With this option, the cellulose blank may be pre-heated before pressing the cellulose blank in the forming mould. As an alternative, the cellulose blank may be pre-heated to a certain extent before pressing and further heated when being pressed.

According to another aspect of the disclosure, the forming mould is heated before pressing the cellulose blank. Through the heating of the forming mould, heat will be transferred to the cellulose blank when being placed in the forming mould. In this way, the forming temperature of the cellulose blank may be achieved in an efficient way through heat transfer from the forming mould.

According to an aspect of the disclosure, the dry forming unit comprises a separating unit, a forming wire and a compacting unit, where the method further comprises the steps: separating cellulose into detached cellulose fibres in the separating unit; arranging the cellulose fibres onto the forming wire; and compacting the cellulose fibres in the compacting unit to form the cellulose blank. In this way an efficient forming of the cellulose blank is accomplished. The dry forming unit may be arranged as a process unit, which is part of a continuous manufacturing process in which the cellulose product is produced. The dry forming unit might as well be placed away from the cellulose forming apparatus whereas the cellulose blank preferably can be supplied in rolls to the cellulose forming apparatus.

According to another aspect of the disclosure, the method further comprises the step: applying a sizing agent to the cellulose fibres to increase the hydrophobic properties and/or mechanical strength of the cellulose blank. Different types of sizing agents may be used in order to increase the hydrophobic properties and/or mechanical strength of the cellulose product produced from the cellulose blank, which may depend on the type of product produced. As an example, the sizing agents may be fluorochemicals, alkyl ketene dimer (AKD), alkenyl succinic anhydride (ASA), rosin (acidic sizing), wax, lignin and water glass (sodium silicate).

According to a further aspect of the disclosure, the cellulose blank is formed as a continuous cellulose web in the dry forming unit. The continuous cellulose web may be used in a continuous manufacturing process, where the continuous cellulose web is dry formed from cellulose fibres in the dry forming unit and then transported to the forming mould.

According to another aspect of the disclosure, the continuous cellulose web is intermittently fed to the forming mould by a feeding unit. Through the intermittent feeding of the continuous cellulose web to the forming mould, the forming of the continuous cellulose web and the forming of the cellulose product in the forming mould may be part of the same production unit for an efficient production of cellulose products from cellulose fibres.

The disclosure further concerns a cellulose product forming apparatus for manufacturing a cellulose product, where the cellulose product forming apparatus comprises a dry forming unit for forming a cellulose blank and a forming mould for forming the cellulose product, wherein the cellulose product forming apparatus is configured to implement the method for manufacturing the cellulose product. Advantages with these features are that the cellulose product is manufactured in a cellulose product forming apparatus in a dry forming process, where the cellulose blank is dry formed from cellulose fibres in the dry forming unit. By heating and pressing the cellulose blank, cellulose products with good material properties are achieved.

According to an aspect of the disclosure, the cellulose blank is formed in the forming mould into a cellulose product having a flat or essentially non-flat shape. Many different types of products can be manufactured, including essentially two-dimensional blanks that may be used for forming three-dimensional products According to another aspect of the disclosure, the dry forming unit comprises a separating unit for separating cellulose into detached cellulose fibres, a forming wire for the cellulose fibres, and a compacting unit for compacting the cellulose fibres to form the cellulose blank.

According to a further aspect of the disclosure, the forming mould is heated by a heating unit. With the heating unit, the cellulose blank may be pre-heated before pressing the cellulose blank in the forming mould. As an alternative, the cellulose blank may be pre-heated to a certain extent before pressing and further heated when being pressed. The heating unit may be integrated in the forming mould so that heat will be transferred to the cellulose blank when being placed in the forming mould. In this way, the forming temperature of the cellulose blank may be achieved in an efficient way through heat transfer from the forming mould.

According to an aspect of the disclosure, a sizing agent or other substances are applied to the cellulose fibres by an application unit. The application unit may for example be in the form of a spray nozzle or a similar device, which is adding the sizing agent to the cellulose fibres in the dry forming unit.

According to other aspects of the disclosure, the dry forming unit is forming the cellulose blank as a continuous cellulose web, and further the continuous cellulose web is intermittently fed to the forming mould by a feeding unit. The continuous cellulose web may be used in a continuous manufacturing process, where the continuous cellulose web is dry formed from cellulose fibres in the dry forming unit and then transported to the forming mould. Through the intermittent feeding of the continuous cellulose web to the forming mould by the feeding unit, the forming of the continuous cellulose web and the forming of the cellulose product in the forming mould may be part of the same production unit for an efficient production of cellulose products from cellulose fibres.

The disclosure further concerns a cellulose product having a flat or essentially non-flat shape. The cellulose product may comprise at least 90 weight percent cellulose fibres.

BRIEF DESCRIPTION OF DRAWINGS

These and other aspects of the present disclosure will now be described in more detail, with reference to the appended drawings showing example embodiments of the disclosure, wherein.

DESCRIPTION OF EXAMPLE EMBODIMENTS

Various aspects of the disclosure will hereinafter be described in conjunction with the appended drawings to illustrate and not to limit the disclosure, wherein like designations denote like elements, and variations of the described aspects are not restricted to the specifically shown embodiments, but are applicable on other variations of the disclosure.

In the present detailed description, a method for manufacturing a cellulose product, a cellulose product forming apparatus, and a cellulose product will be described.

Various embodiments of sheet materials or blanks according to the disclosure are mainly discussed with reference to a cellulose blank placed in position for forming in a forming mould, in a flat shape. It should be noted that this by no means limits the scope of the present invention, which equally well includes, for example, a blank pre-shaped into a three-dimensional object. For instance, the blank may be presented to the forming mould in a shape similar to the desired final shape of the object. Another embodiment could comprise a cellulose blank, which is supplied to the mould in a web on a roll.

A flat shape may refer to a generally two-dimensional (2D) shape, such as for example the shape of a blank or a sheet material, and essentially non-flat shapes may refer to any suitable three-dimensional (3D) shape. An object according to the disclosure may be made in a two-dimensional shape, a three-dimensional shape, or formed into a three-dimensional shape from a two-dimensional blank or sheet material.

Moreover, by schematically showing a coherent sheet of cellulose fibres, this will by no means limit the scope of present invention, which equally well includes, for example, blanks with loose and separated fibres applied to the forming mould.

In the present detailed description, various embodiments of the three-dimensional cellulose products to be formed and the mould to form the cellulose products according to the present invention are mainly discussed with reference to a hollow bowl, a hollow cup or a hollow bottle, with mainly uniform thickness. It should be noted that this by no means limits the scope of the present invention, which equally well includes, for example, complex shapes with different thickness, non-hollow portions or massive objects. For instance, the object can advantageously comprise stiffeners, creases, holes, 3D shaped text, hinges, locks, threads, snaps, feet, handles or surface patterns.

Figure 1:
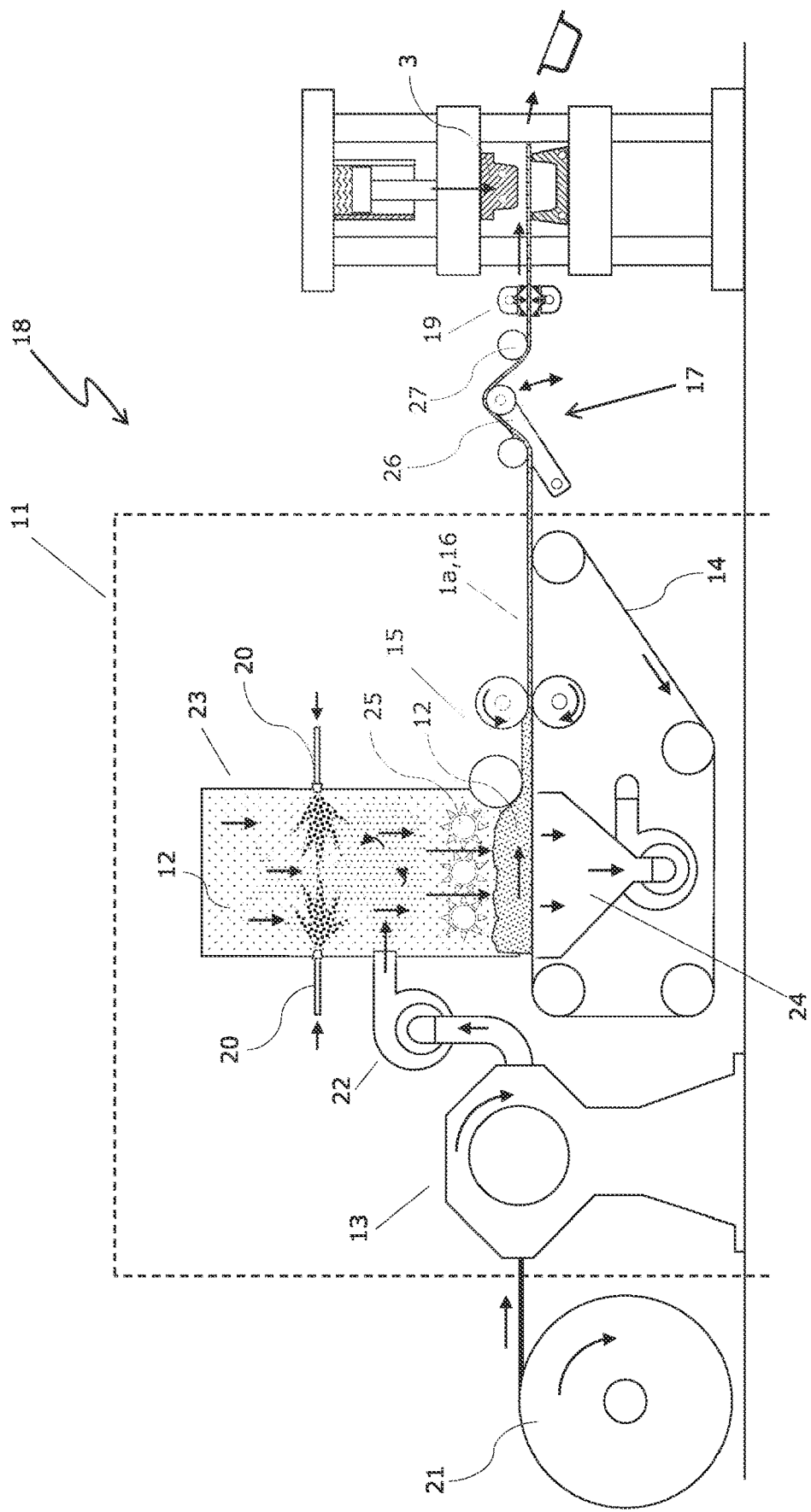
FIG. 1 shows schematically, a cellulose product forming apparatus according to the disclosure.

In FIG. 1, a method for manufacturing a cellulose product in a cellulose product forming apparatus 18 is schematically shown, where a cellulose blank 1a is dry formed in a dry forming unit 11, arranged in a forming mould 3, heated to a forming temperature and pressed in the forming mould 3 with a forming pressure. In a first step, the cellulose blank 1a is dry formed in the dry forming unit 11. The dry forming unit 11 is in FIG. 1 schematically illustrated with a dotted line and comprises a separating unit 13, a forming box 23, a forming wire 14 and a compacting unit 15. The cellulose blank 1a is in the method formed into a cellulose product having a flat or essentially non-flat shape.

In the separating unit 13, cellulose is separated into detached cellulose fibres 12. The cellulose used in the separating unit 13 may come from any suitable source, such as for example wood pulp and fluff pulp, or cellulose fibres from cotton, linen, hemp, sugar cane and grain. Other types of cellulose may also be used and depending on the design of the separating unit 13 it may even be possible to re-use cellulose fibres from textiles, paper, cardboard or other suitable sources. As an example, the separating unit may be a conventional hammer mill. Standard virgin fluff pulp may be used as cellulose raw material and can for example be purchased on the open market in rolls. In FIG. 1, a roll 21 of for example fluff pulp is used as raw material, which is fed into the separating unit 13.

The cellulose fibres 12 are arranged onto the forming wire 14 in a conventional way within the dry forming unit 11. The detached cellulose fibres 12 may be drawn from the separating unit 13 by a centrifugal fan 22 and blown into the forming box 23, which for example may be in the form of an air carding tower, arranged above the forming wire 14. The forming tower or box 23 comprises a housing with an open bottom providing direct access for the detached cellulose fibres 12 onto the underlying forming wire 14. A vacuum box 24 may be arranged underneath the upper part of the forming wire 14. The centrifugal fan 22 is supplying the detached cellulose fibres 12 into the inside of the forming box 23 and a number of fibre separating rollers 25 in one or more rows may be arranged in the forming box housing between the fiber inlet and the forming box housing bottom to distribute the cellulose fibres 12 evenly onto the forming wire 14. The centrifugal fan 22 is thus extracting the detached cellulose fibres 12 from the separating unit 13 and is blowing the cellulose fibres 12 into the forming box 23. The cellulose fibres 12 are drawn by the vacuum in the vacuum box 24 onto the forming wire 14 in order to form a cellulose web which is further transported by the forming wire 14 to the compacting unit 15. The forming wire 14 may be arranged in a conventional way as an endless belt made for example from a woven mesh structure, which endless belt can be moved continuously with a constant speed when forming the cellulose web. The density of the cellulose web may be chosen so that it is suitable for the cellulose product to be formed.

In order to form the cellulose blank 1a from the cellulose web, the cellulose fibres 12 are compacted or calendared in the compacting unit 15. The compacting unit 15 may be designed with one or more compacting or calendaring rolls integrated within the dry forming unit 11 and the one or more compacting rolls may be arranged together with the forming wire 14. As an example, a compacting roll may be arranged above the forming wire, so that the compacting roll is applying a compacting pressure on the cellulose web formed in the dry forming process. In this way, the cellulose blank 1a is formed as a continuous cellulose web 16 in the dry forming unit 11. The compacting or calendaring rolls may be heated when compacting the cellulose fibres 12.

The dry forming of the cellulose blank 1a may take place as a separate process step, in which the cellulose blank 1a may be stacked in sheets or arranged as a rolled web, before forming of the cellulose product. As an alternative, the dry forming of the cellulose blank 1a may be part of a continuous process, as shown in FIG. 1, in which the cellulose product is manufactured in the cellulose product forming apparatus, and the dry forming of the cellulose blank 1a will then be an initial process step before arranging, heating, and pressing the cellulose blank 1a in the forming mould 3.

In order to form the cellulose product, the cellulose blank 1a is arranged in the forming mould 3, where the cellulose blank 1a thereafter is heated to a forming temperature in the range of 100° C. to 200° C. and then pressed in the forming mould 3 with a forming pressure of at least 1 MPa. The heating and pressing of the cellulose blank 1a in the forming mould 3 will be further described below. Tests have shown that suitable pressure levels may be in the range of 1-100 MPa. The heating of the cellulose blank 1a may take place before the pressing in the forming mould 3 or at least partly before the pressing in the forming mould 3. As an alternative, the heating of the cellulose blank 1a is taking place in the forming mould 3 when being pressed. The heating of the cellulose blank 1a may for example be accomplished through heating the forming mould 3 before pressing the cellulose blank 1a. The pressure may also be applied before heating the cellulose blank 1a, and for example the heating of the cellulose blank may take place in the forming mould 3 during pressing.

When pressing the cellulose fibres with the forming pressure of at least of 1 MPa with a forming temperature in the range of 100° C. to 200° C., the cellulose fibres 12 will be bonded to each other in a way so that the resulting cellulose product will have good mechanical properties. Tests have shown that higher forming temperatures will give stronger bonding between the cellulose fibres 12 when being pressed at a specific forming pressure. With forming temperatures above 100° C. together with a forming pressure of 1-100 MPa, the cellulose fibres 12 will be strongly bonded to each other. A higher forming temperature will increase the fibril aggregation, water resistance, Young's modulus and the mechanical properties of the final cellulose product. The high pressure is important for fibril aggregation between the cellulose fibres 12 in the cellulose product. At temperatures higher than 200° C., the cellulose fibres 12 will thermally degraded and therefore temperatures above 200° C. should be avoided. The forming pressure and the forming temperature may be chosen to be suitable for the specific cellulose product to be produced.

The cellulose blank 1a may be arranged into the forming mould 3 in any suitable way, and as an example, the cellulose blank 1a may be manually arranged in the forming mould 3. Another alternative is to arrange a feeding device for the cellulose blank 1a, which is transporting the cellulose blank 1a to the forming mould. The feeding device could for example be a conveyor belt, an industrial robot, or any other suitable manufacturing equipment. If the dry forming of the cellulose blank 1a is part of a continuous manufacturing process in which the cellulose product is produced, as shown in FIG. 1, the cellulose blank 1a may be fed to the forming mould 3 from the dry forming unit 11 with the forming wire 14. More specifically, the cellulose blank 1a could be intermittently fed to the forming mould 3 by a feeding unit 17 if the forming wire 14 is moving with a constant speed through the dry forming unit 11 and the forming of the cellulose products in the forming mould 3 is taking place in intermittent process steps.

The cellulose blank may, as an example, be intermittently fed to the forming mould via a feeding unit 17 in the form of a buffer zone arrangement, as shown in FIG. 1. A pivot roller arm 26 with a lift roller lifts and bends the cellulose blank 1a in a gentle arc with a synchronized servo controlled movement. In this way, a suitable length of the cellulose blank 1a is buffered to enable on-demand incremental feeding of the cellulose blank 1a into the forming mould 3. When the pivot roller arm 26 is lowered, the buffered cellulose blank 1a can be fed intermittently to the forming mould 3. The pivot roller arm 26 is thus lifted and lowered in a repeated manner to accomplish the buffering of the cellulose blank 1a, so that the cellulose blank 1a may be intermittently fed to the forming mould 3, via for example feeding rollers 27 arranged after the pivot roller arm 26.

As an alternative, instead of using a feeding unit 17, the movement of the forming mould 3 may be reciprocating and synchronized with the feeding of the cellulose blank 1a, enabling constant speed of the cellulose blank 1a through the production process. In this way, the forming mould moves with and in the feeding direction of the cellulose blank during pressing of the cellulose product.

As described above, the cellulose product is manufactured from cellulose fibres 12, and the cellulose product may comprise at least 90 weight percent cellulose fibres. It would be possible to have a cellulose product manufactured from cellulose fibres only, but sizing agents or other suitable additives may be applied to the cellulose fibres 12 to increase the hydrophobic properties, mechanical strength and/or other properties of the cellulose blank 1a. The sizing agents or additives may be applied in the forming of the cellulose blank 1a, for example in the separating unit 13. Other suitable substances that may be added to the cellulose fibres may for example be different forms of starch, such a starch from potatoes, grain or corn in powder form, which may be added to the cellulose fibres 12 before forming of the cellulose product in the forming mould 3. By adding starch, the strength of the final cellulose product will be increased. As an example, the cellulose product may comprise 90-98 weight percent cellulose fibres and 2-10 weight percent other substances, such as starch, sizing agents, and/or other suitable additives and substances. It may also be possible to have a lower amount of cellulose fibres than 90 weight percent if other suitable substances are used. Other suitable substances that may be added to the cellulose fibres are for example additives or sizing agents traditionally used in wet forming of paper products, fluorochemicals, alkyl ketene dimer (AKD), alkenyl succinic anhydride (ASA), rosin (acidic sizing), wax, lignin and water glass (sodium silicate). In order to secure that the cellulose product can be recycled after use, the added substances may be biodegradable or suitable for recycling.

As described above in relation to FIG. 1, the cellulose product forming apparatus 18 comprises a dry forming unit 11 for forming the cellulose blank 1a and a forming mould 3 for forming the cellulose product. The cellulose product forming apparatus 18 may be constructed as a continuous production unit for cellulose products as one single production unit, in which the cellulose products are manufactured from cellulose raw material. The cellulose blank 1a is first formed in the dry forming unit 11 and then formed into a cellulose product in the forming mould 3, where the cellulose product may have a flat or essentially non-flat shape.

The dry forming unit comprises the separating unit 13 for separating cellulose into detached cellulose fibres 12, the forming box 23 and forming wire 14 for the cellulose fibres 12, and the compacting unit 15 for compacting the cellulose fibres 12 to form a cellulose blank 1a. As shown in FIG. 1, a separately arranged heating unit 19 is heating the cellulose blank 1a before the pressing of the cellulose blank 1a in the forming mould 3. As an alternative, the forming mould 3 may instead be heated by the heating unit 19, in which a heated fluid medium, an electrical heater, or other suitable heating means is used for the heating of the forming mould 3.

The sizing agent, additive or other substances needed are applied to the cellulose fibres 12 by an application unit 20. The application unit may for example be in the form of one or more spray nozzles or similar devices, which is adding the sizing agents or other substances to the cellulose fibres 12 in the dry forming unit 11.

The feeding unit 17 is arranged after the dry forming unit so that the cellulose blank 1a in the form of a continuous cellulose web 16 can be intermittently fed to the forming mould 3 by the feeding unit 17.

In the following, the forming of the cellulose product from the cellulose blank 1a in the forming mould 3 will be further described. The forming methods of the cellulose product from the cellulose blank 1a in the forming mould 3 described below may be part of a continuous cellulose product forming method, and the different types of forming moulds 3 described may be integrated in the cellulose product forming apparatus 18.

Figure 2A:
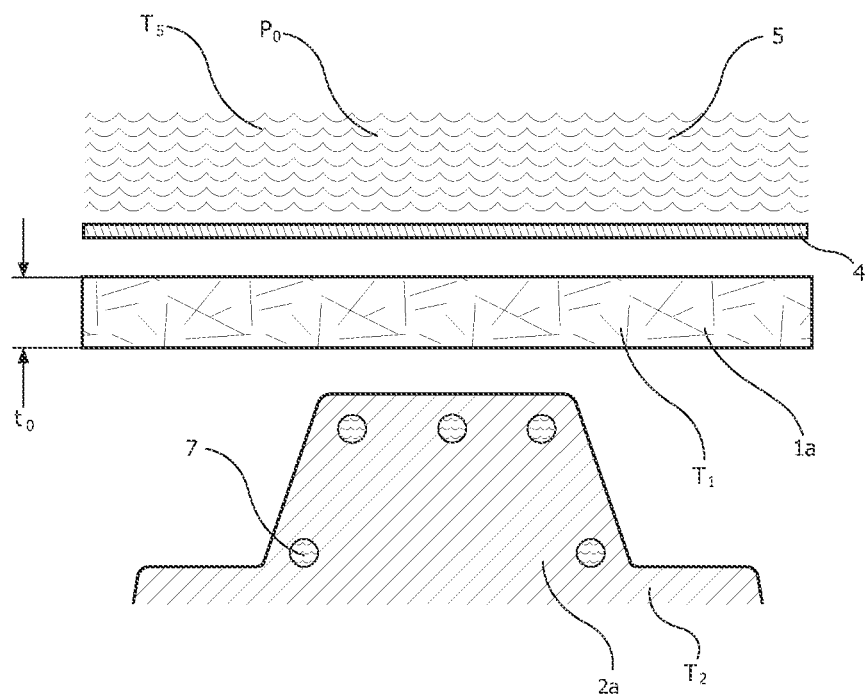
FIG. 2a-b show schematically a first alternative configuration of the compressing device, using multi-use membrane, shown initial stage (a) and compressed stage (b) according to an example embodiment of the present disclosure.

The forming mould 3, which may be a force defined compressing device, according to an example embodiment of the present disclosure will now be described with reference to FIGS. 2a-b. In FIG. 2a, a schematic side view of the compressing device or pressure moulding device, in the form of the forming mould 3 for cellulose fibres using heat is shown in an open state. The compressing device or forming mould 3 may be constructed so that an isostatic pressure is applied when forming the cellulose product. The pressure applied may also be non-isostatic so that different pressure levels are applied in different parts of the forming mould 3 when forming the cellulose product.

The forming mould 3 of this embodiment of the present disclosure uses one stiff forming mould part 2a placed under a multi-use membrane 4. The membrane 4 constitutes a seal for a pressure media or fluid 5, such as for example hydraulic oil, contained in a pressure chamber, not shown in the figure. The membrane 4, also called diaphragm, can preferably be made of rubber, silicon, elastomer or polyurethane.

Similar press devices are found in completely different industries like for example when forming metal sheets for aircrafts or processing of metallic powder into homogeneous materials. Presses for conventional purposes normally use very high pressure, such as within the range 1000-2000 bar.

The cellulose blank 1a, mainly comprising cellulose fibres with some additives and agents, has as shown in FIG. 2a been placed in a gap between the membrane 4 and the stiff forming mould part 2a, which in FIG. 2a is arranged below the membrane 4. The cellulose blank 1a may also contain an amount of water, which for example may depend on the humidity of the surrounding atmosphere.

In order to form the cellulose product, or a part of a cellulose product, from the cellulose blank 1a, the cellulose blank 1a, has to be heated to a forming temperature $T_1$, which may be in the range 100° C. to 200° C. The forming mould part 2a may be heated to a desired temperature $T_2$ so that heat is transferred to the cellulose blank 1a in order to achieve the forming temperature $T_1$ of the cellulose blank 1a. The forming mould 3 may for example be pre-heated to a temperature of 150-170° C. by pumping heated oil into internal channels 7 of the forming mould part 2a. An alternative way to pre-heat the forming mould 3 is to use integrated electrical resistors, not shown in the figure. The cellulose blank 1a can also be pre-heated, for example by using infrared rays prior to tool entrance. Heating the pressure media 5 to a pressure media temperature $T_5$ may also be a suitable alternative.

Figure 2B:
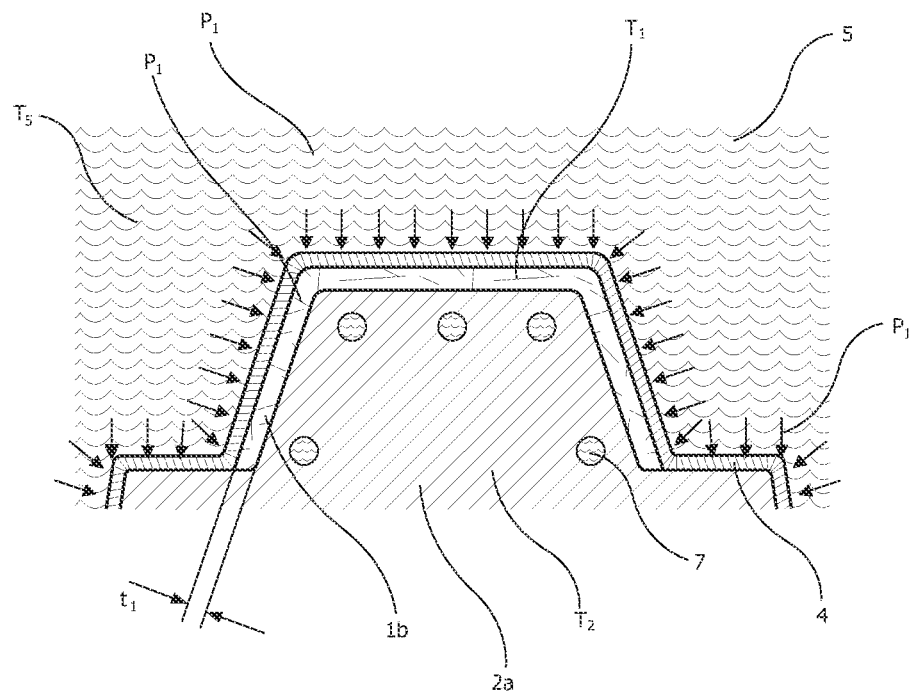

In FIG. 2b, hydraulic oil used as pressure media 5 has been pressurized to a pressure of at least 1 MPa, and the membrane 4 has wrapped the heated forming mould 2a with the compressed material 1b forming the cellulose product in-between. A suitable pressure $P_1$ when forming the cellulose product may be within the range 1-100 MPa. By applying a suitable pressure, the cellulose fibres are compressed. The applied pressure may be uniform or isostatic in order to compress the cellulose fibres evenly regardless of their relative position on the forming mould 2a and regardless of the actual local amount of fibres. In an alternative embodiment, the pressure may instead be non-isostatic so that different pressure levels in different parts of the forming mould 3 are used to form the cellulose product. This may for example be used if different structural properties in different parts of the cellulose product are desired.

The compressing device may comprise a fluid control device (not shown in the figures) for the pressure media 5, and may be an actuator compressing the fluid or a fluid flow control device for controllable allowing pressurized fluid to enter the pressure chamber having the flexible membrane 4 as a portion of a wall thereof. The apparatus may comprise the fluid, or the fluid may be air taken from the surrounding atmosphere.

The present inventors has found that a pressure $P_1$ of 4 MPa (40 bar) at a temperature of 160° C. when forming the cellulose product gives a fibril aggregation in the cellulose fibres that compares with many thermoplastics after 10 seconds of holding time.

In order to reduce the cycle time for industrial production of cellulose products from compressed material 1b, the cooling of said compressed material 1b may for example be done by pumping cooled oil into internal channels 7 arranged in the forming mould part 2a or into the pressure chamber wherein the forming mould part 2a temperature $T_2$ and pressure media temperature $T_5$ quickly can be lowered after the fibril aggregation has completed in the cellulose fibres.

The process and the device will return to its open state shown in FIG. 2a by lowering the pressure media 5 to atmospheric pressure $P_0$ wherein said membrane 4 will retract to its more or less flat initial state and wherein the finished cellulose product can be ejected and be cut free from unwanted residual compressed or uncompressed cellulose fibres.

The final thickness $t_1$ of the cellulose product may vary slightly depending on the actual local amount of cellulose fibres.

In an alternative embodiment, a stiff forming mould part may be used instead of the flexible or pliable membrane 4, which may be suitable if different pressure levels are desired when forming the cellulose product. The use of a flexible membrane 4 may provide an isostatic compressing method resulting in a homogeneous cellulose product with high strength and short production cycle time.

Figure 3A:
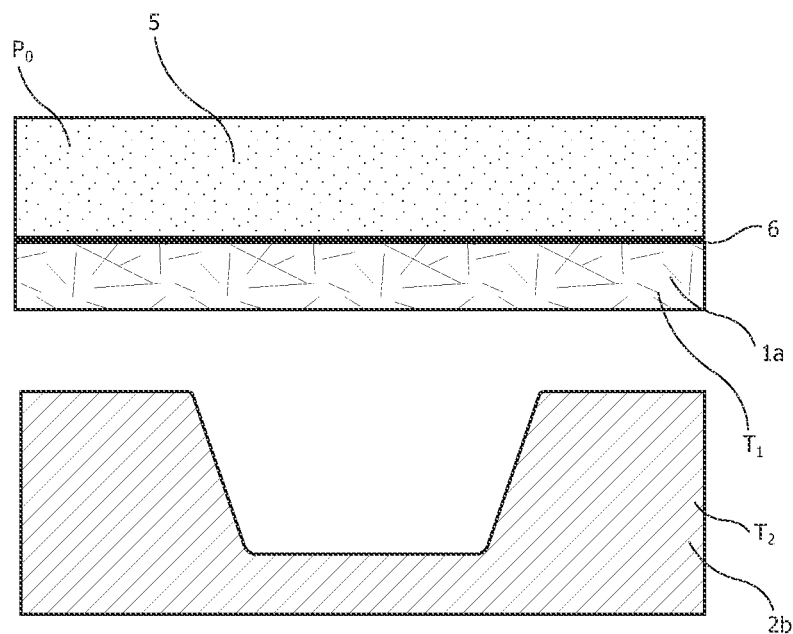
FIG. 3a-b show schematically a second alternative configuration of the compressing device, comprising single-use material integrated barrier, shown initial stage (a) and compressed stage (b) according to an example embodiment of the present disclosure.
Figure 3B:
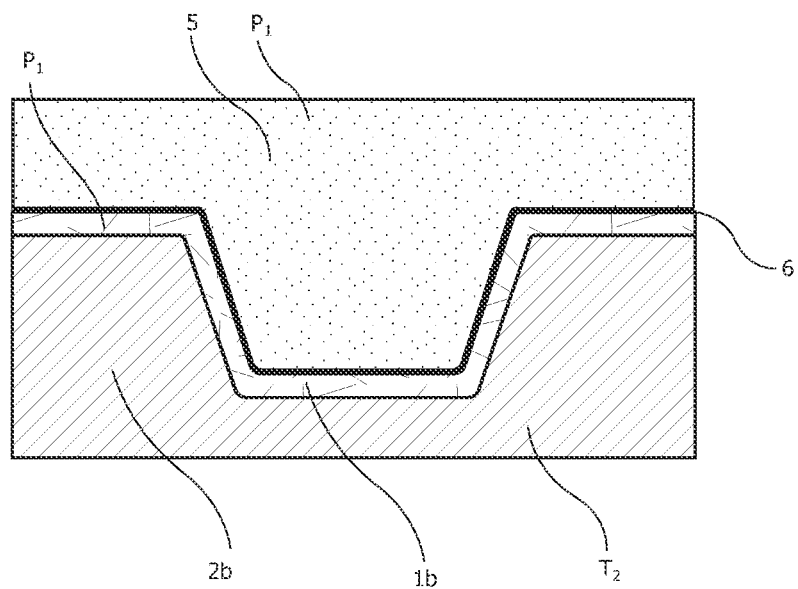

Referring to FIGS. 3a-b, the multi-use membrane 4 in FIGS. 2a-b has been replaced with a single-use membrane comprising a thin film barrier 6 wherein said film barrier 6 may be pre-applied to the cellulose blank 1a when the cellulose blank 1a was produced or wherein the film barrier 6 is provided to the compressing device, for example from rolls, not shown in the figures, and applied to the cellulose blank 1a during the isostatic compression of the cellulose blank 1a.

Said thin film barrier 6 may be made of a thermoplastic material like PET, biopolyethylene, or PLA, having a thickness within the range 1-700 μm.

FIG. 3a schematically shows the method comprising a compressing device or forming mould 3 in its initial open state, using the thin film barrier 6 applied to the cellulose fibres 1a, comprising a lower negative forming mould part 2b preheated to temperature $T_2$ and a pressure media or fluid 5, preferably gas or air at atmospheric pressure, contained in the pressure chamber, not shown in the figure.

FIG. 3b shows the same device and cellulose blank 1a as shown in FIG. 3a in the compressed state wherein the pressure media 5, preferably compressed air or a non-contaminating liquid as water, has been pressurized to the pressure $P_1$ and wherein the thin film barrier 6 separates and seals the pressure media from the compressed material 1b of the cellulose blank 1a and wherein the pressure media 5 and membrane 6 forming equal pressure acting on the cellulose fibres across the heated forming surface, with a temperature $T_2$, of said forming mould part 2b.

By holding a specific pressure at a specific temperature for a certain period of time X, the fibril aggregation in the cellulose fibres will create a bio-composite component of the compressed material 1b with mechanical properties close to thermoplastics. If as an example, the pressure $P_1$ being 4 MPa (40 bar), the forming temperature $T_1$ being 140° C., the temperature $T_2$ of the forming mould part 2b being 160° C., and the time period X being 10 seconds, the bio-composite component of the compressed material 1b with mechanical properties close to thermoplastics can be achieved. The time period X may for example range from 0.1 seconds to several seconds, depending on the forming temperature of the cellulose blank and the pressure applied.

By removing the pressure media 5 and lowering the pressure to atmosphere pressure $P_0$ after the time period X, the cellulose product formed by the compressed material 1b can be ejected and if needed cut to its final shape.

One advantage with the method discussed in FIGS. 3a-b is that the film barrier 6 also can function as a barrier towards other media to be exposed to the component during usage. For example, if the cellulose product provided with the film barrier 6 is a bowl for on-the-go salads it is desired to have a barrier 6 to protect the cellulose fibres in the compressed material 1b from contact with the vegetables and to decrease the hygroscopic features of the bowl. This method could also be used for producing bottles or containers for liquid goods, and the cellulose product may thus be suitable for packaging different types of liquids or beverages, including carbonated liquids.

Turning to FIGS. 4a-d, the forming mould 3 comprises at least two openable and closable negative forming surfaces or parts 2a, 2b, surrounding a tube shaped cellulose blank 1a comprising a film barrier 6 wherein the outer layer is uncompressed cellulose fibres and its additives and the inner layer 6 a single-use membrane comprising a thin film barrier 6. The blank can preferably be supplied to the compressing device in rolls, not shown in the figure, in flat shape wherein the blank is formed into a tube shape, not shown in the figure, surrounding a pressure media nozzle 8.

Figure 4A:
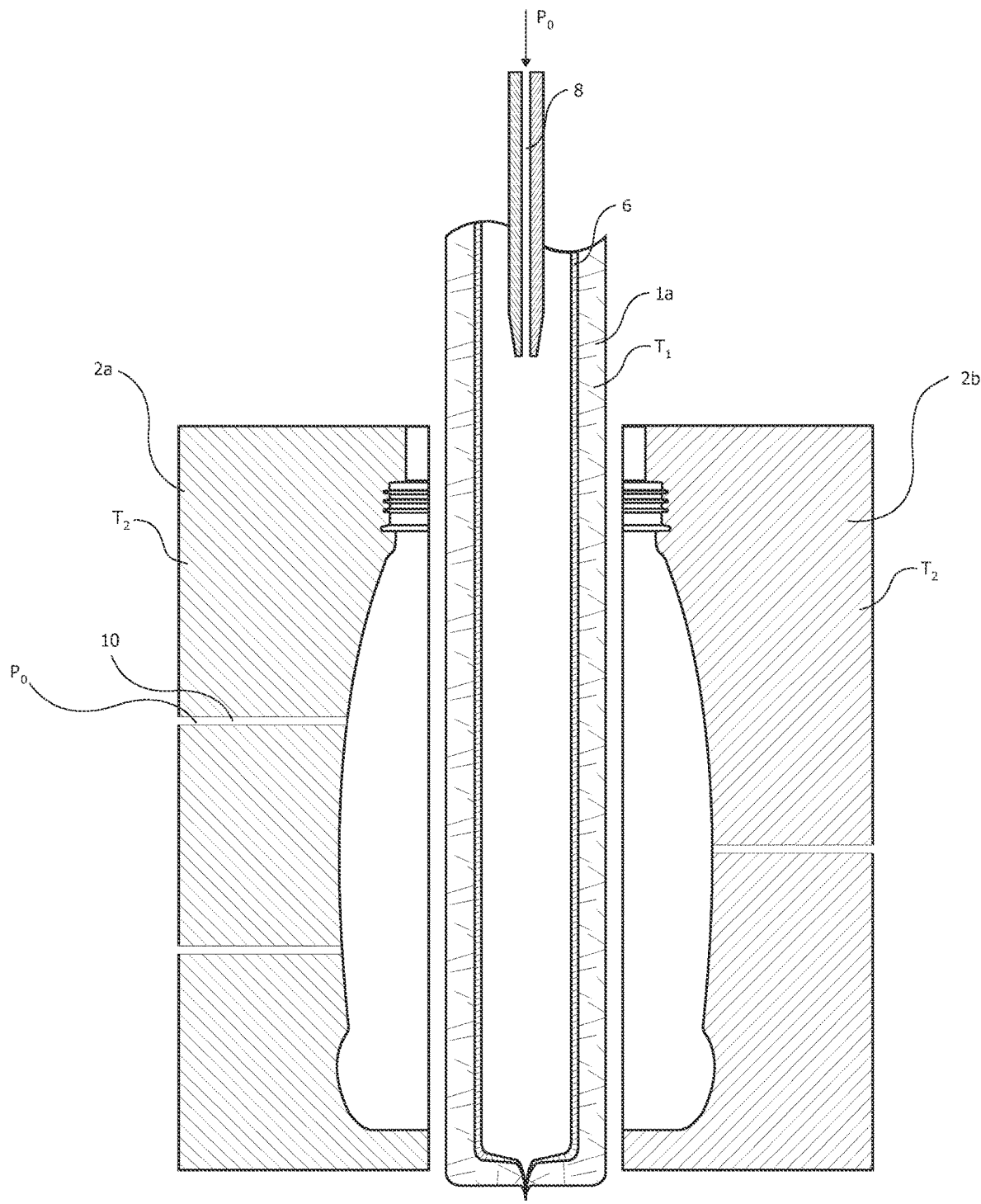
FIG. 4a-d show schematically a third alternative configuration of the compressing device and component, using single-use material integrated barrier and blow moulding, shown initial stage (a & b) and compressed stage (c) according to an example embodiment of the present disclosure.

In FIG. 4a, the forming mould 3 with the forming surfaces or parts 2a, 2b are pre-heated to the forming mould temperature $T_2$, and are schematically shown in the open initial stage of the forming process method. The tube shaped cellulose blank 1a with the film barrier 6 is supplied from the top surrounding the fixed pressure media nozzle 8, which means that the tube shaped cellulose blank 1a with the film barrier 6 is supplied in a direction from above into the forming surfaces 2a, 2b.

Figure 4B:
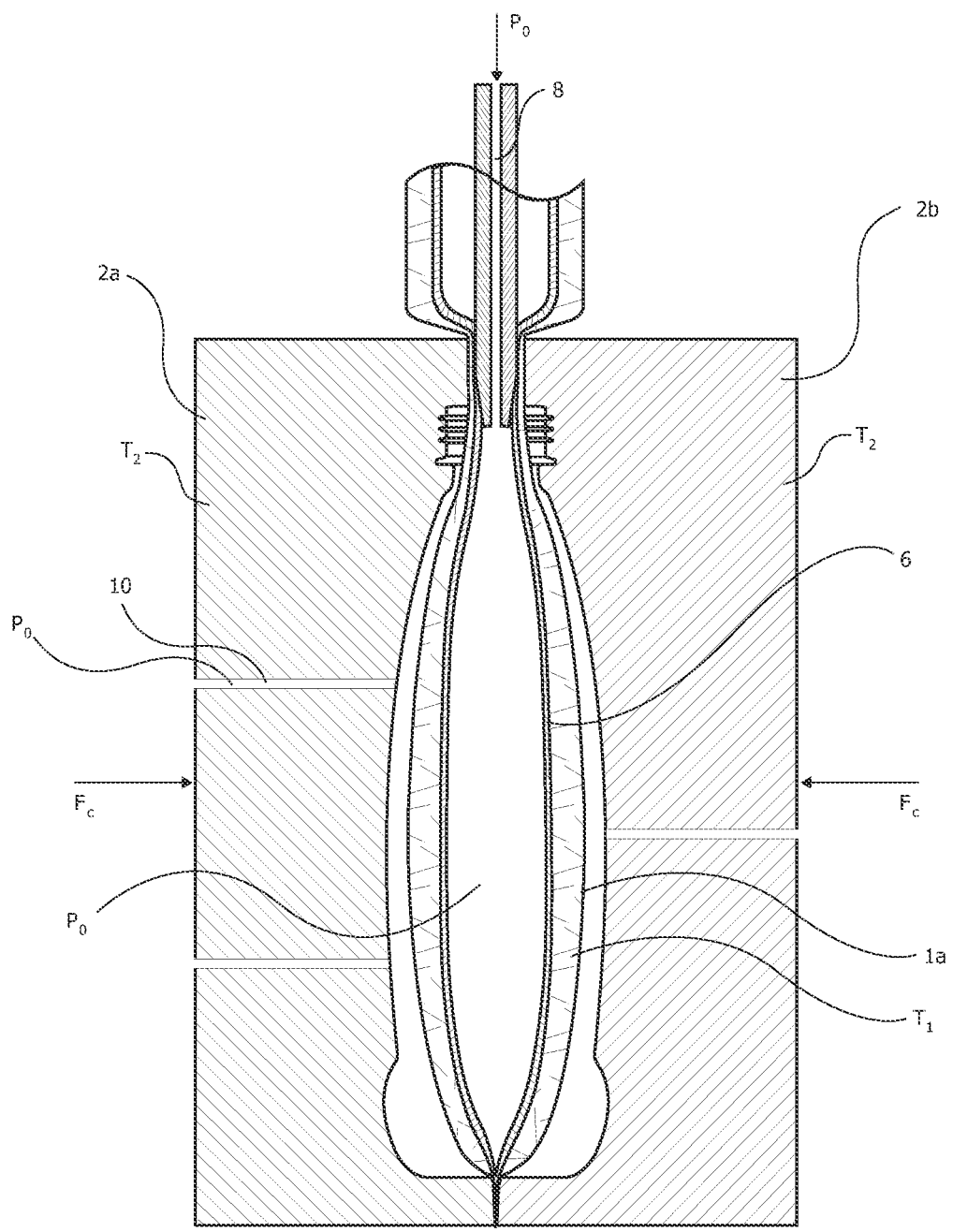
Figure 4C:
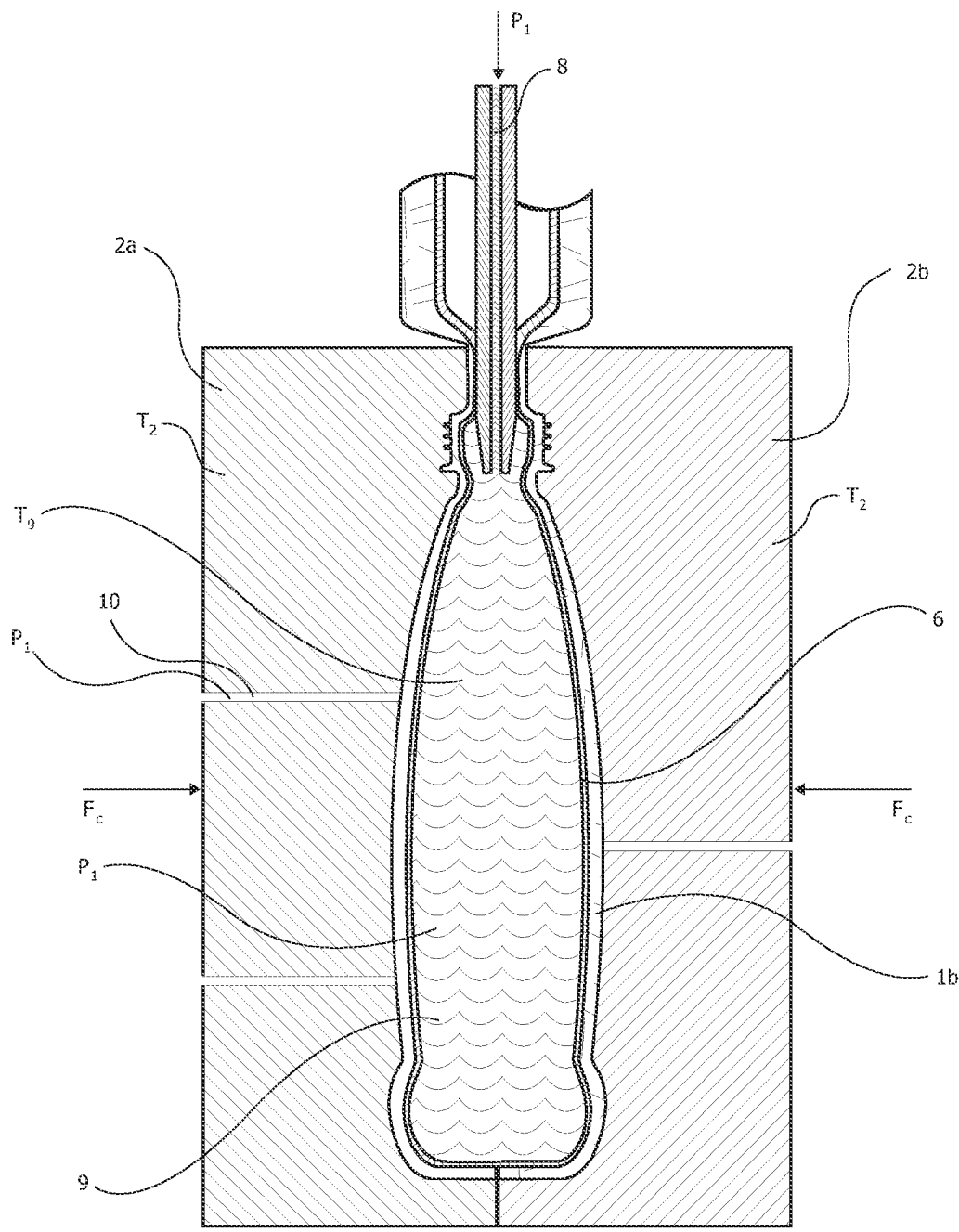

By closing the pre-heated forming mould 3, a closing force $F_c$ is applied, which is higher than an opening force created by the pressure $P_1$ applied by the pressure media 9 to the inside of the forming mould 3 by the pressure media nozzle 8, shown in FIG. 4c. The closed state of the forming mould 3 with the forming surfaces 2a, 2b is schematically shown in FIGS. 4b-c. The closing force $F_c$ and the design of the forming surfaces 2a, 2b adjacent to the top and bottom of the cavity will seal the inner volume of the cellulose blank 1a from the outside atmospheric pressure $P_0$.

In an alternative embodiment, not shown in the figures, the cellulose blank 1a may be cut by the forming moulds from residual material when the forming mould 3 is closed. One or both forming mould parts may be provided with a cutting device, such as for example a sharp cutting edge, for cutting the cellulose product free of unwanted residual compressed or un-compressed cellulose fibres in the same pressing motion as when forming the cellulose product in the forming mould. This cutting device may be designed to fit a specific thickness of the cellulose product. The cutting device may cut the edge of the formed cellulose product in both two-dimensional and three-dimensional shapes depending on the desired shape of the cellulose product. The cutting device may be constructed in different ways to be efficient for cutting the final product, for example a narrow incision arranged on one of the forming mould parts interacting with a protruding cutting edge on the other forming mould part, or a cutting edge arrange on one of the forming mould parts interacting with a cutting surface on the other forming mould part. As an alternative, the cutting device may be arranged as a movable cutter integrated in the mould, which is moving in a direction relative to the pressing motion.

Any residual cellulose fibers 12, not used in the cellulose product, may be collected and fed back to the separating unit 13 for recycling purposes.

FIG. 4c shows the forming and fibrile aggregation phase of the method of present invention wherein said inner volume of the blank has been filled with pressure media 9 from the pressure media nozzle 8 and pressurized to the pressure $P_1$ wherein the pressure media 9 and the single-use membrane 6 forming equal pressure acting on the cellulose fibres across the heated forming surface of said forming moulds 2a and 2b.

The filling process is taking place between the steps shown in FIGS. 4b and 4c, and requires air channels 10 to enable the air outside the cellulose blank 1a with the film barrier 6 in the cavity of the forming mould 3 to be drained during the blank expansion process.

Figure 4D:
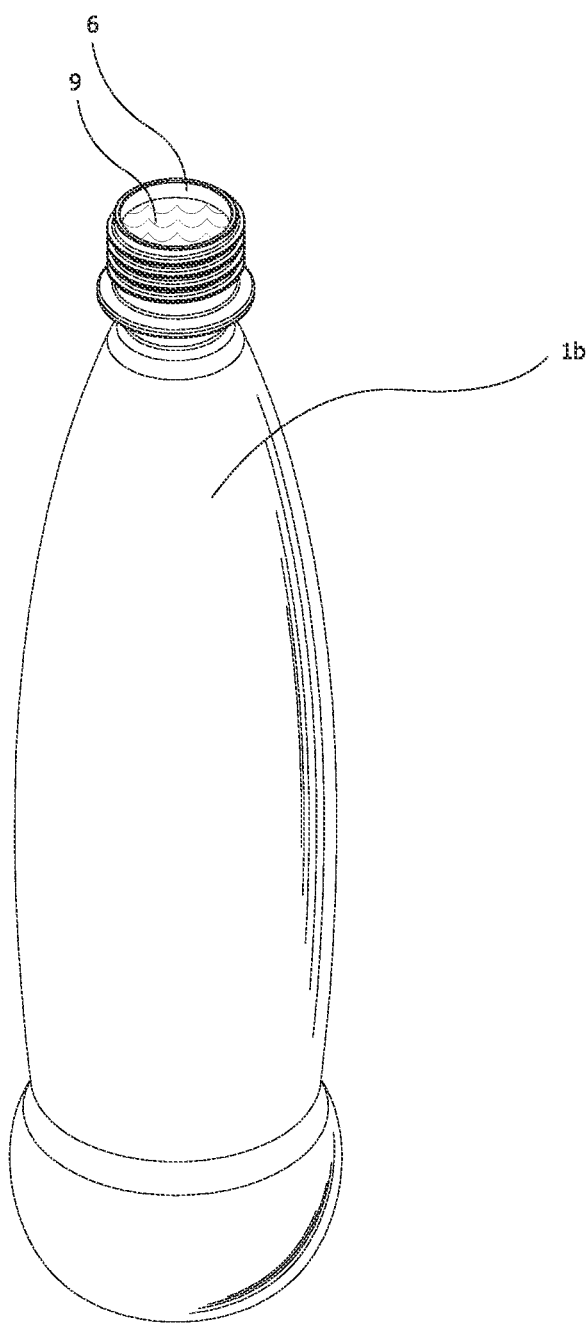

FIG. 4d illustrates a three-dimensional cellulose product in the form of a hollow object made from the compressed material 1b and the film barrier 6, e.g. a bottle for beverages, formed by the method described in FIG. 4a-c filled with said pressure media 9, wherein the film barrier 6 separates the pressure media 9 from the compressed cellulose fibres 1b.

According to present disclosure, the pressure media 9 may in this embodiment be constituted by the beverage that is intended to be filled into the cellulose product, such as e.g. milk, juice, water and carbonated beverages.

The film barrier 6 can preferable be made of a thin thermoplastic material like PET, biopolyethylene or PLA, having a thickness in the range of 1-700 µm, wherein the film barrier 6, conventionally applied in paper packages for beverages, also seal the cellulose fibres 1b from contact with the beverage during storage and usage of the cellulose product.

The cycle time for the process step shown in FIG. 4c can be reduced if the beverage is cooled to a temperature $T_9$, for example in the range of 1-20° C., and filled fast, preferably in less than a second. If the forming mould 3 with the forming surfaces 2a, 2b is pre-heated to a mould temperature $T_2$, which for example is 200° C. and the blank is pre-heated to a temperature $T_1$, of for example 140° C., the pressure media temperature $T_9$ will enable release of the filled bottle from the forming mould 3 in cycle times of seconds or even less.

Figure 5A:
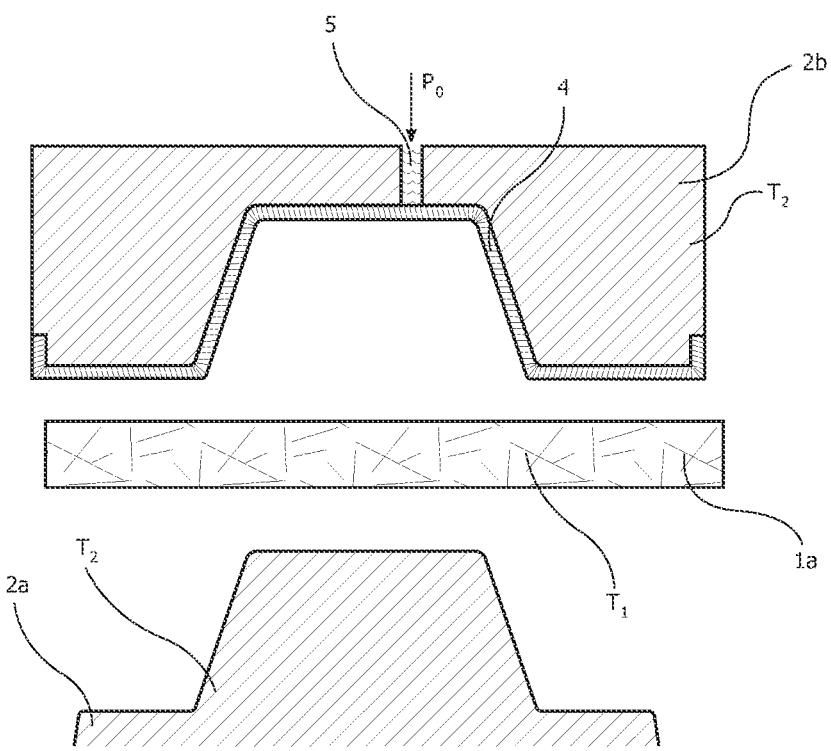
FIG. 5a-b show schematically a fourth alternative configuration of the compressing device, using multi-use membrane, shown initial stage (a) and compressed stage (b) according to an example embodiment of the present disclosure.
Figure 5B:
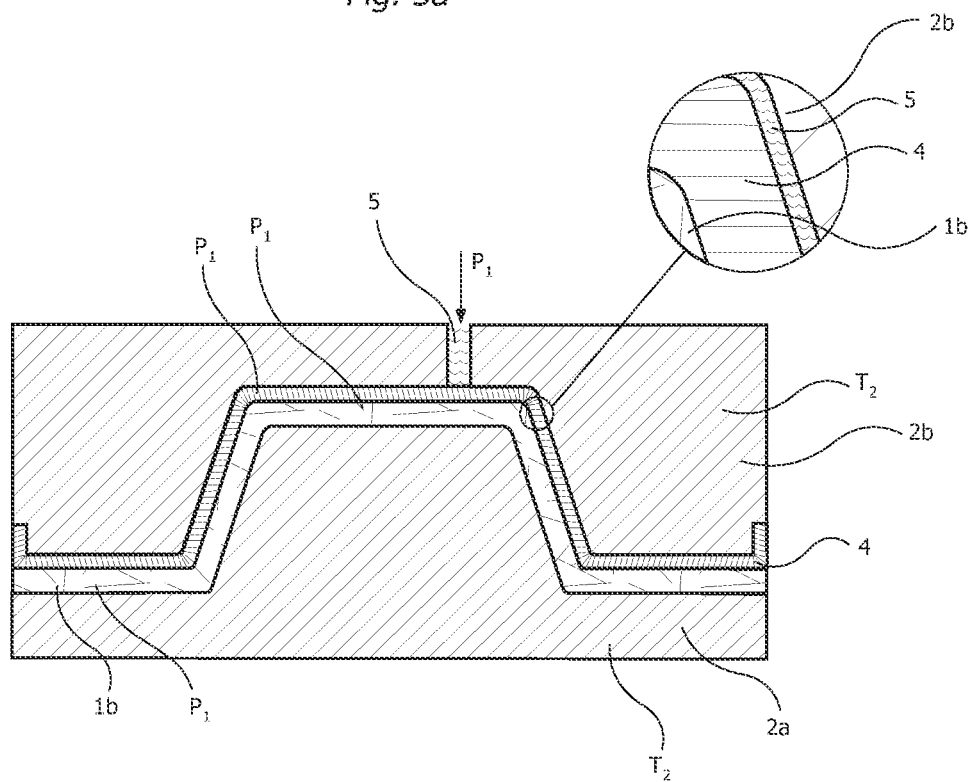

FIGS. 5a-b schematically show another principle of the present disclosure, wherein the compressing device comprises at least one positive forming mould part 2a, at least one negative pressure mould part 2b and a multi-use pre shaped membrane 4, wherein the pressure media 5 is pressurized to the pressure $P_1$ after the mould parts 2a and 2b, surrounding the cellulose blank 1a, has been closed.

The final forming stage where fibril aggregation in the cellulose fibres of the cellulose blank 1a takes place is shown in FIG. 5b. The enlarged cross section shown in FIG. 5b illustrates how the pressure media 5 penetrates into the forming mould 3 between the upper negative pressure mould part 2b and the membrane 4 wherein a pressure $P_1$, uniformly will compress the cellulose blank 1a towards the forming surface of the pre-heated lower positive forming mould 2a. The penetration of pressure media 5 can be facilitated by minor indentations, not shown in the figure, in the surface of the upper negative pressure mould part 2b acting as micro channels for the pressure media 5.

The embodiment of the compressing device according to FIGS. 5a-b may be beneficial compared to the method discussed in FIGS. 2a-b, where shorter cycle times are preferred. The membrane 4 does not have to deform to the same extent in the embodiment shown in FIGS. 5a-b.

The above described examples of the compressing method, with reference to FIGS. 2-5, comprises a flexible membrane 4, which may be used to provide an isostatic pressure. It should be understood that forming of three-dimensional objects in all-cellulose composite using heated compression moulding of cellulose fibres, such as wood pulp processed with only water can be obtained using conventional tools while still achieving isostatic pressure.

Figure 6A:
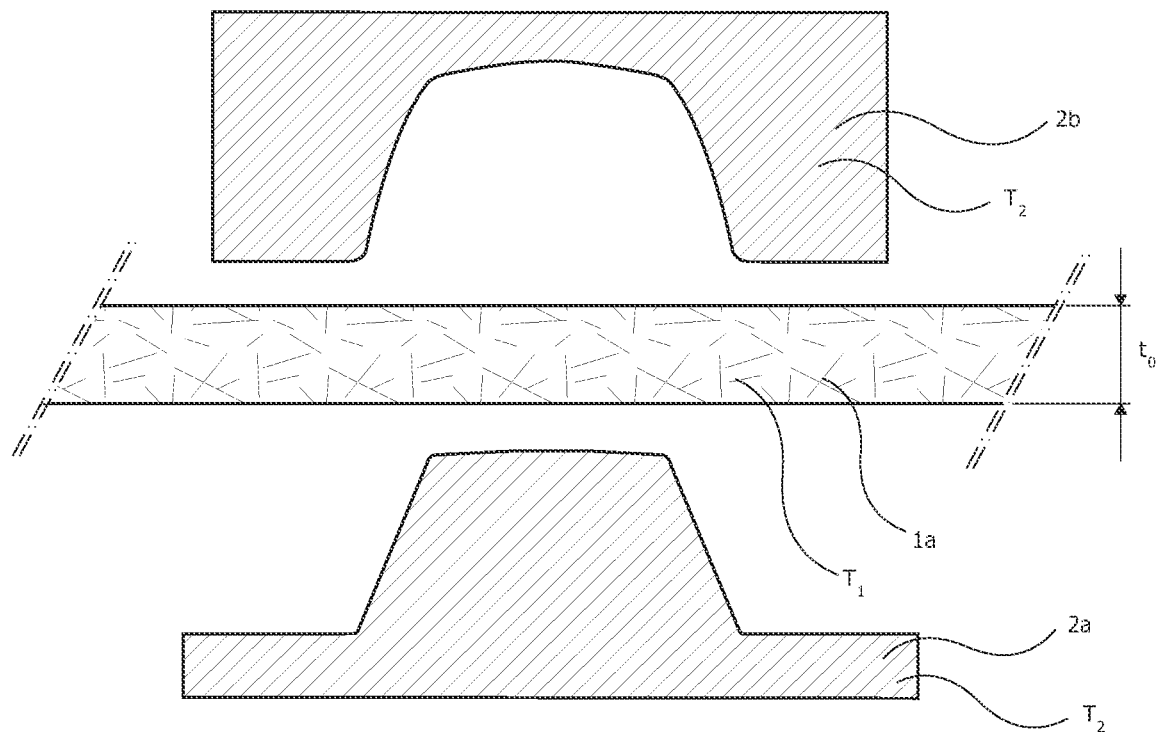
FIG. 6a-c show schematically a fifth alternative configuration of the compressing, using cavity compensating pressure control, shown initial stage (a & b) and compressed stage (c) according to an example embodiment of the present disclosure.
Figure 6B:
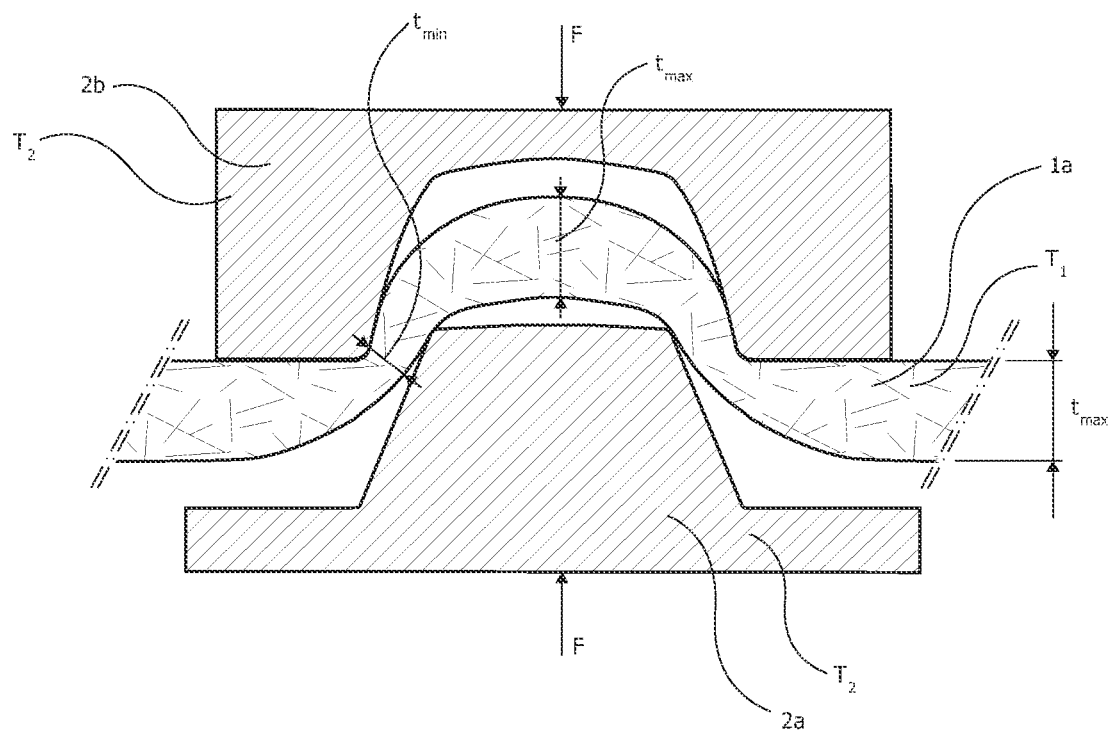
Figure 6C:
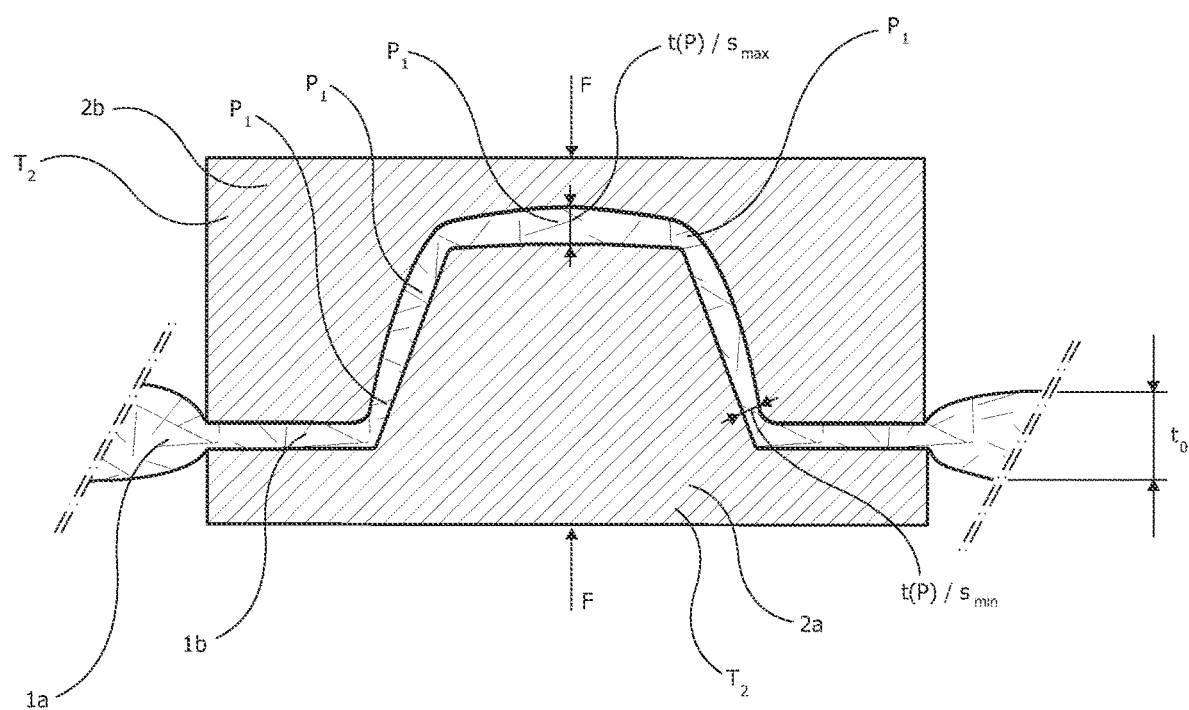

Referring to FIGS. 6a-c, an upper pre-heated negative non-flexible pressure mould part 2b and a lower pre-heated positive non-flexible forming mould part 2a, surrounds the cellulose blank 1a wherein the cavity thickness t(P) between the lower pre-heated positive non-flexible forming mould part 2a and the upper pre-heated negative non-flexible pressure mould part 2b deviates from nominal even thickness where the deviation is theoretically and/or practically established to create an isostatic pressure $P_1$ on every portion of cellulose blank 1a towards the mould parts 2a and 2b when the mould parts are pressed together with the force F.

FIG. 6a schematically shows the embodiment in an initial open state with the cellulose blank in a flat state fed to the mould parts in a continuous web 1a. FIG. 6c schematically shows the embodiment in a closed state with the cellulose blank 1a in a compressed non-flat state. FIG. 6b schematically shows the embodiment in a state in-between the open and the closed, in a non-compressed non-flat state.

FIGS. 6a-c show an example of a compressing device for a hollow bowl, where the positive forming mould part 2a has a nominal, preferred, shape and where the negative pressure mould part 2b has a compensated shape in order to obtain equal pressure $P_1$.

As shown in FIG. 6b the blank is deformed by the two mould parts 2a, 2b wherein the thickness t of the cellulose blank 1a varies due to friction and deformation restrain in the cellulose blank 1a. In this schematic example, which can be altered in many ways, the cellulose blank 1a will end up with a thinnest thickness $t_{min}$, adjacent to the cavity entrance of the pressure mould 2b and a thickest thickness $t_{max}$ on the top of the forming mould 2a.

The cavity thickness, s, between the two mould parts 2a, 2b is therefore compensated so the most narrow cavity thickness $s_{min}$ is situated adjacent to where the cellulose blank is thinnest $t_{min}$ and the most wide cavity thickness $s_{max}$ is situated adjacent to where the un-compressed cellulose blank 1a is thickest $t_{max}$, by means of the negative pressure mould 2b, pressing the cellulose blank 1a against the forming positive mould 2a with a substantially equal forming pressure $P_1$ acting on the cellulose blank 1a across the forming surface.

Moreover, the relation between thickness of the cellulose blank, t, and the cavity thickness, s, and the final cavity shape, is also related to the geometrical pressure generation of the cavity. The force F determines the pressure $P_1$ on top of the positive forming mould part 2a while the convexity, thickness and angel of the cavity adjacent to the most narrow cavity thickness $s_{min}$ determines the final pressure $P_1$.

The inventors of present invention have found that the final shape of the cavity is a complex algorithm t(P) in order to obtain substantially isostatic pressure $P_1$ where both mathematical, preferably FEM-analysis, and empirical tests, preferably trial-and-error, is required to obtain equal pressure all over the component.

According to another embodiment of the present disclosure, without flexible membrane, the geometrically pressure compensated cavity in FIGS. 6a-c can be substituted with thickness compensation of the cellulose blank.

Figure 7A:
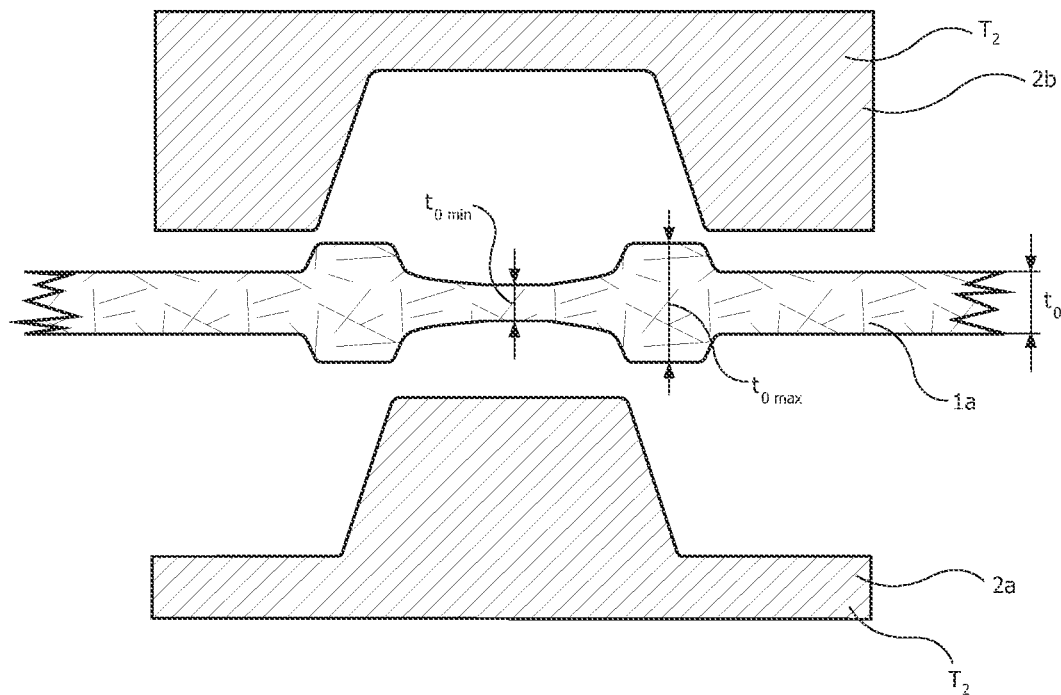
FIG. 7a-b show schematically a sixth alternative configuration of the compressing device, using blank thickness compensation, shown initial stage (a) and compressed stage (b) according to an example embodiment of the present disclosure.
Figure 7B:
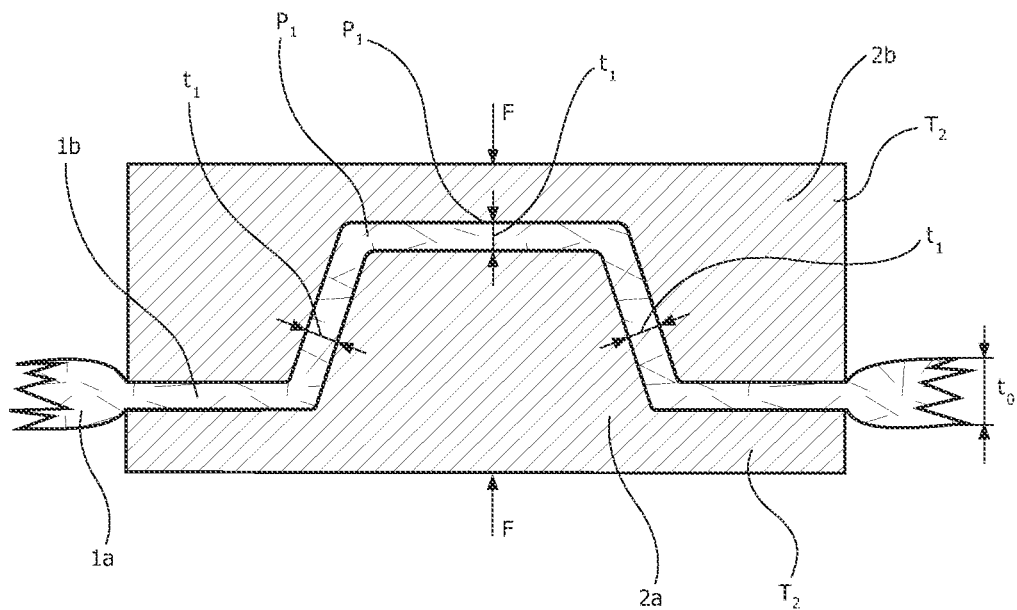

FIGS. 7a-b schematically show a traditional non-compensated pressure negative forming mould part 2b and a non-compensated positive forming mould part 2a, with a preferred equal and nominal cavity thickness, t, wherein the blank has a pressure compensated thickness between $t_{min}$-$t_{max}$ established with same theory and in the same manner as described for the embodiment discussed in relation to FIGS. 6a-c.

The preference for the method of creating isostatic pressure without flexible membrane, presented in relation to FIGS. 6a-c and 7a-b, relates to shorter cycle time and lower cost for the compressing device. However, the development effort might be more costly for the method using stiff moulds.

The advantage for using the method described in relation to FIGS. 7a-b over the method described in relation to FIGS. 6a-c is the achieved even thickness $t_1$ of the final cellulose product. However, the blanks might be more costly to produce in the method described in FIGS. 7a-b.

Figure 8A:
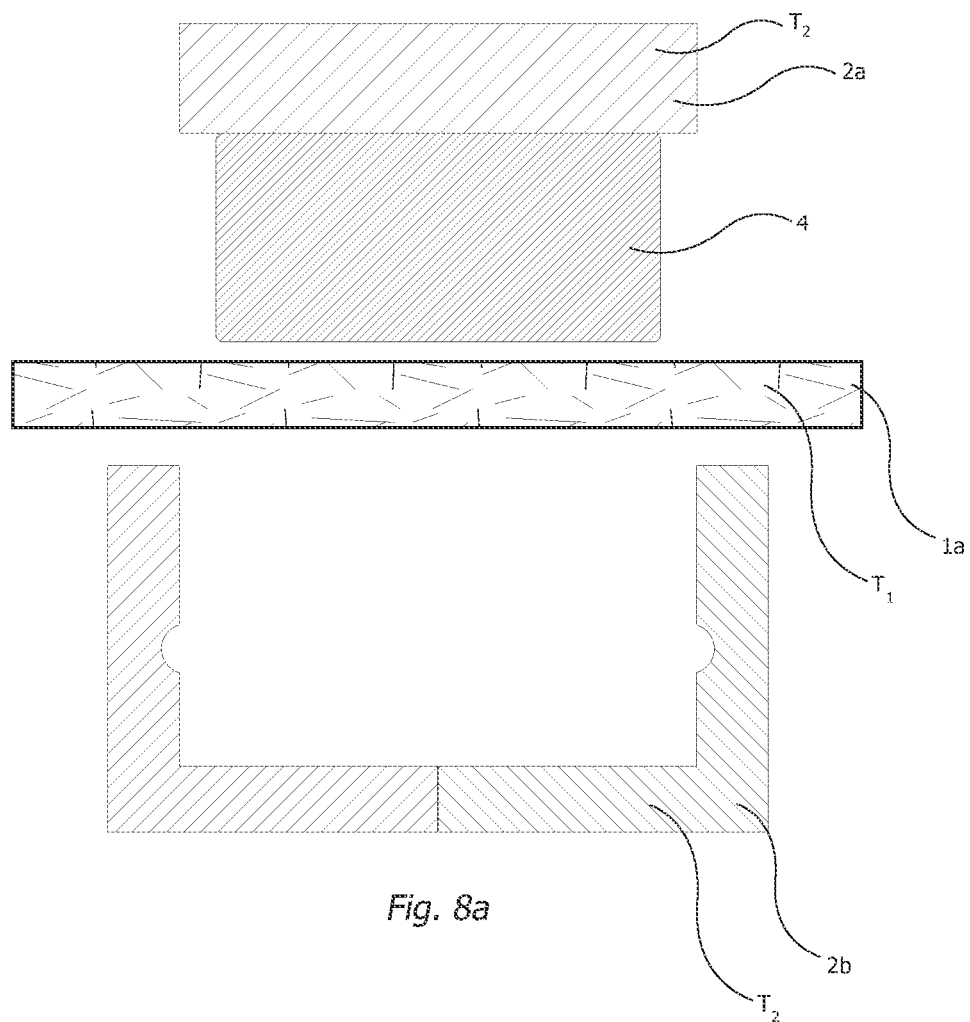
FIG. 8a-c schematically show an alternative configuration of the compressing device, using a massive flexible membrane, according to the disclosure.
Figure 8B:
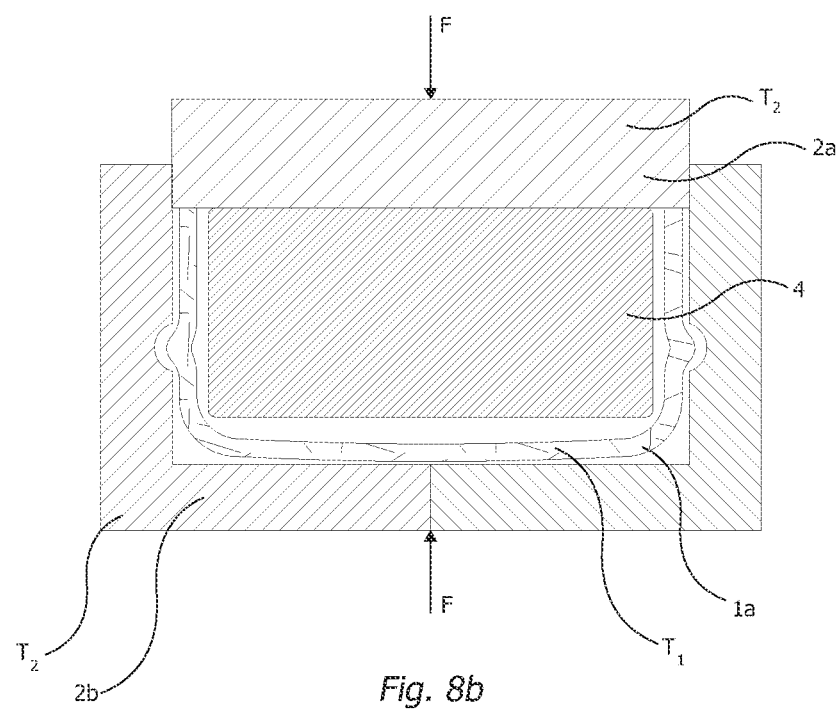
Figure 8C:
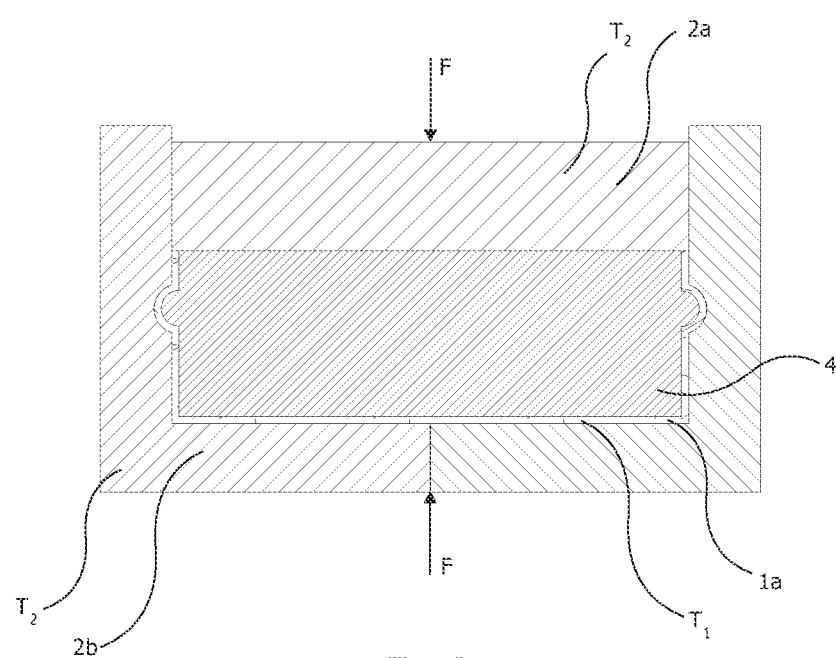

As an alternative, the forming mould 3 may also be arranged with a membrane constructed as a massive flexible membrane structure. In FIGS. 8a-c an alternative forming mould 3 with a negative forming mould part 2b and a positive forming mould part 2a is schematically shown. The positive forming mould part 2a is applying a forming pressure, F, on a massive flexible membrane 4, which is applying an isostatic pressure on the cellulose blank 1a when forming the cellulose product. With massive flexible membrane is meant a flexible structure, which has a similar ability to apply the isostatic pressure to the cellulose blank 1a, as the membrane structures described in the embodiments above, but with a greater elastic deformation zone compared to thinner membrane structures. The massive flexible membrane 4 may be constructed with a thick membrane structure or even be made of a homogenous body of a flexible material. The flexible material may have properties that will make the material float out between the forming mould parts when pressure is applied to the body. In the embodiment shown in FIGS. 8a-c, the massive flexible membrane 4 is constructed from a homogenous body of a flexible material.

In an alternative embodiment, the massive flexible membrane 4 may have a varied thickness, where the massive flexible membrane is for example shaped or casted into a structure with a varied thickness. The thinner and thicker areas of the massive flexible membrane with varied thickness may compensate for areas in the forming mould parts which need smaller or bigger deformation of the membrane in order to equalize or even out the pressure subjected to the cellulose blank 1a. By using a massive flexible membrane structure the forming mould can be made cheaper and simpler in construction.

The massive flexible membrane 4 is constructed so that when the pressure, F, is applied from the forming mould parts, the massive flexible membrane 4 deforms in order to provide the isostatic pressure. The massive flexible membrane 4 may be made of a material with suitable properties, such as for example rubber, latex, polyurethane or silicone. Other suitable materials or combinations of materials with elastomeric properties may also be used. Due to the flexible properties of the massive flexible membrane 4, the massive flexible membrane 4 applies an isostatic pressure to the cellulose blank 1a.

In FIG. 8a, the cellulose blank 1a is placed between the negative forming mould part 2b and the massive flexible membrane 4. The positive forming mould part 2a is pushing the massive flexible membrane 4 and the cellulose blank 1a into the negative forming mould part 2b when the forming pressure, F, is applied to the forming mould parts, as shown in FIGS. 8a-b. When forming the cellulose product, the negative forming mould part 2b is heated to a forming mould part temperature $T_2$ and during the forming process, the cellulose blank 1a is heated to a forming temperature $T_1$, see FIGS. 8a-c.

Figure 9A:
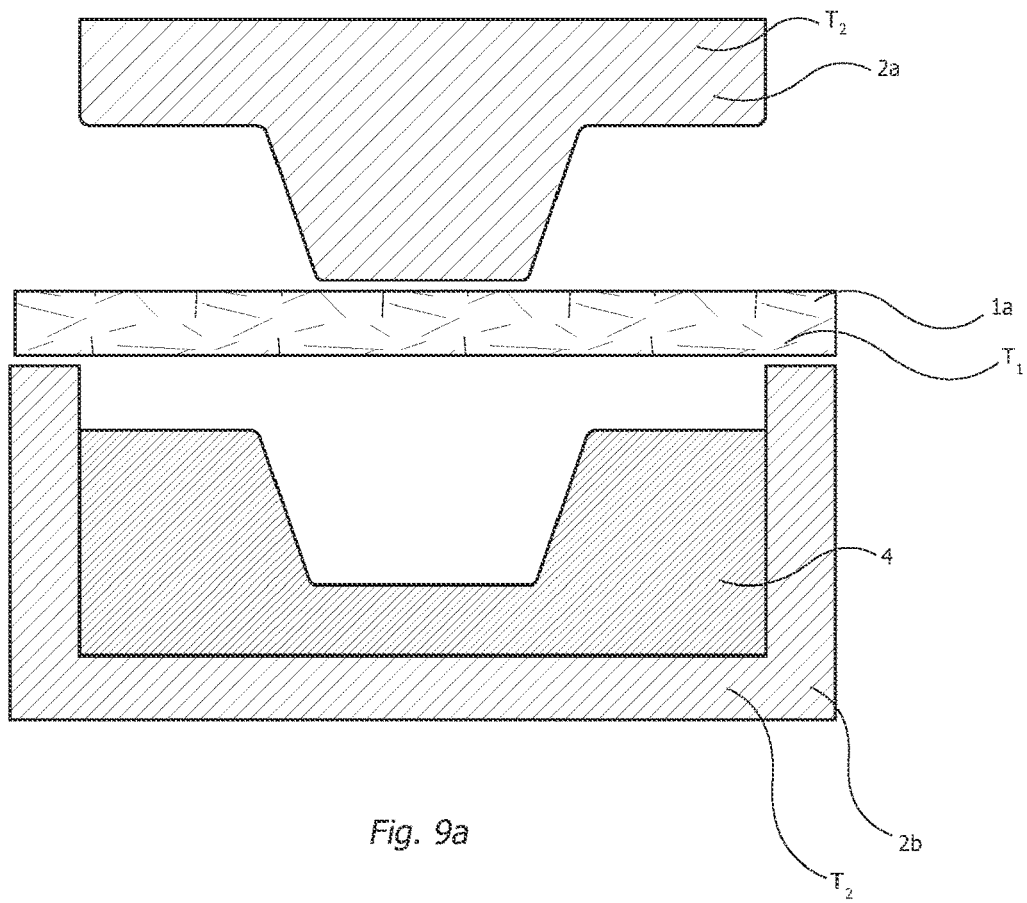
FIG. 9a-c schematically show another alternative configuration of the compressing device, using a massive flexible membrane, according to the disclosure.
Figure 9B:
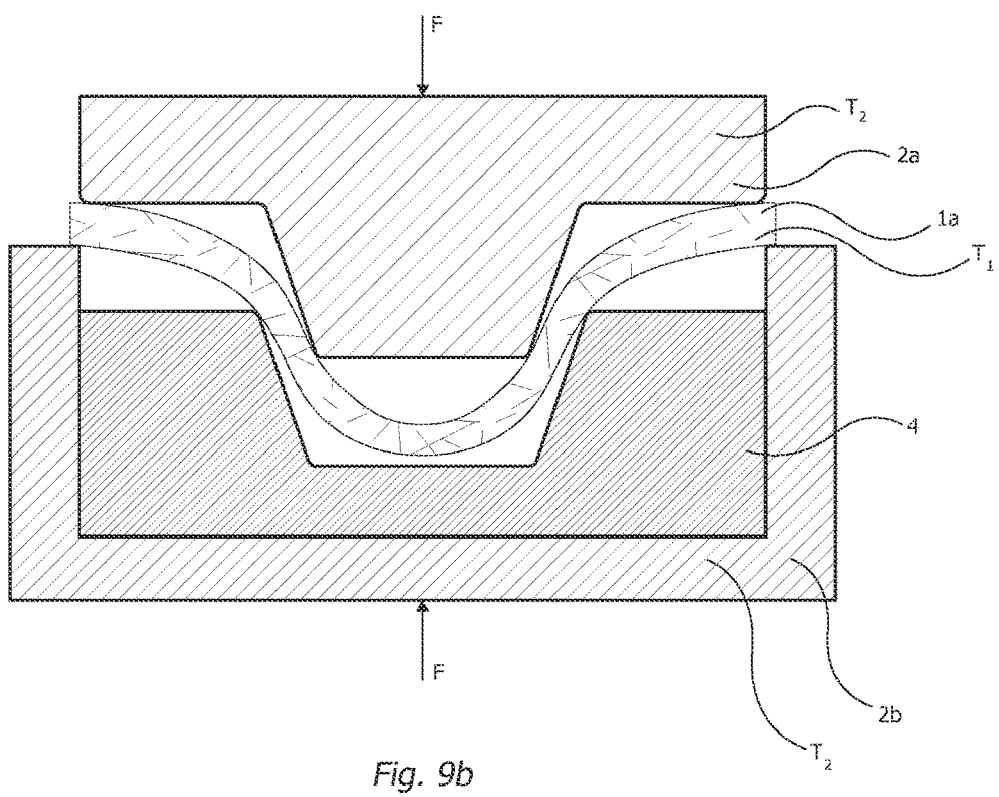
Figure 9C:
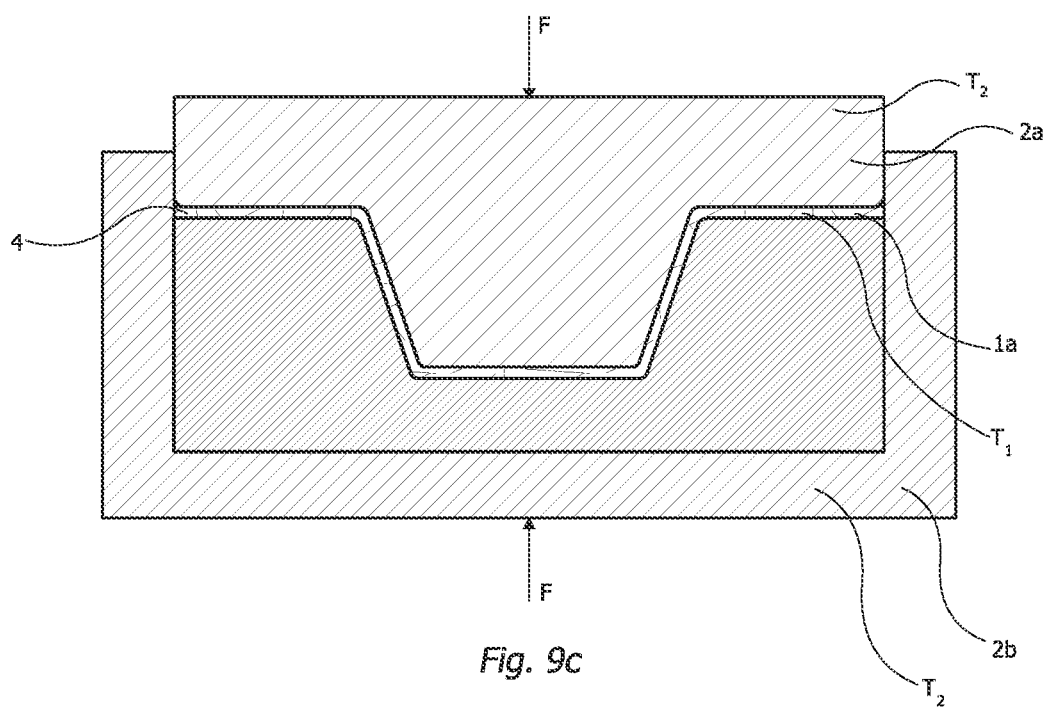

In FIGS. 9a-c another alternative forming mould 3 with a negative forming mould part 2b and a positive forming mould part 2a is schematically shown. The negative forming mould part 2b is applying a forming pressure, F, on a massive flexible membrane 4, which is applying an isostatic pressure on the cellulose blank 1a when forming the cellulose product. The massive flexible membrane 4 is constructed so that when the pressure, F, is applied from the forming mould parts, the massive flexible membrane 4 deforms in order to provide the isostatic pressure. The massive flexible membrane 4 may be of the same construction as described above in relation to the embodiment shown in FIGS. 8a-c. In the embodiment shown in FIGS. 9a-c, the massive flexible membrane 4 has a varied thickness to match the shape of the positive forming mould part 2a. Due to the flexible properties of the massive flexible membrane 4, the massive flexible membrane 4 applies an isostatic pressure to the cellulose blank 1a.

In FIG. 9a, the cellulose blank 1a is placed between the positive forming mould part 2a and the massive flexible membrane 4. The positive forming mould part 2a is pushing the cellulose blank 1a into the negative forming mould part 2b towards the massive flexible membrane 4 when the forming pressure, F, is applied to the forming mould parts, as shown in FIGS. 9a-b. When forming the cellulose product, the positive forming mould part 2a is heated to a forming mould part temperature $T_2$ and during the forming process, the cellulose blank 1a is heated to a forming temperature $T_1$, see FIGS. 9a-c.

In the claims, the word "comprising" does not exclude other elements or steps, and the indefinite article "a" or "an" does not exclude a plurality. The mere fact that certain measures are recited in mutually different dependent claims does not indicate that a combination of these measured cannot be used to advantage It will be appreciated that the above description is merely exemplary in nature and is not intended to limit the present disclosure, its application or uses. While specific examples have been described in the specification and illustrated in the drawings, it will be understood by those of ordinary skill in the art that various changes may be made and equivalents may be substituted for elements thereof without departing from the scope of the present disclosure as defined in the claims. Furthermore, modifications may be made to adapt a particular situation or material to the teachings of the present disclosure without departing from the essential scope thereof. Therefore, it is intended that the present disclosure not be limited to the particular examples illustrated by the drawings and described in the specification as the best mode presently contemplated for carrying out the teachings of the present disclosure, but that the scope of the present disclosure will include any embodiments falling within the foregoing description and the appended claims. Reference signs mentioned in the claims should not be seen as limiting the extent of the matter protected by the claims, and their sole function is to make claims easier to understand.

REFERENCE SIGNS

1a: Cellulose blank
1b: Compressed material
2a-b: Forming mould parts
3: Forming mould
4: Membrane
5: Pressure media
6: Film barrier
7: Internal channels
8: Pressure media nozzle
9: Pressure media
10: Air channels
11: Dry forming unit
12: Cellulose fibres
13: Separating unit
14: Forming wire
15: Compacting unit
16: Continuous cellulose web
17: Feeding unit
18: Cellulose product forming apparatus
19: Heating unit
20: Application unit
21: Roll
22: Centrifugal fan
23: Forming box
24: Vacuum box
25: Fibre separating rollers
26: Pivot roller arm
27: Feeding rollers

The invention claimed is:

1. A method for manufacturing a cellulose product having a non-flat shape comprising the steps of: providing a cellulose product forming apparatus comprising a forming mould;
   dry forming a cellulose blank in a dry forming unit;
   arranging the cellulose blank in the forming mould, the forming mold comprising a stiff forming mould part and a multi-use membrane, where the multi-use membrane constitutes a seal for a pressure media or fluid contained in a pressure chamber wherein the stiff forming mould part comprises a positive stiff forming mould part and a negative stiff pressure mould part, and wherein a shape of the multi-use membrane in a natural state corresponds to the shape of the negative stiff pressure mould part and/or positive stiff forming mould part;
   heating the cellulose blank to a forming temperature in the range of 100° C. to 200° C.; and
   pressing the cellulose blank in the forming mould with a forming pressure of at least 1 MPa via the pressure media or fluid.

2. A method according to claim 1, wherein the cellulose product forming apparatus comprises a fluid control device for controllable allowing pressurized fluid to enter a pressure chamber having the flexible membrane as a portion of a wall thereof.

3. A method according to claim 2,
   wherein the fluid control device is an actuator compressing the pressure media or fluid, and
   wherein the cellulose product forming apparatus comprises the pressure media or fluid, or wherein the pressure media is air taken from the surrounding atmosphere.

4. A method according to claim 1, wherein the cellulose product forming apparatus returns to its open state by lowering the pressure media to atmospheric pressure, such that the membrane will retract to a flat initial state and enabling ejection of the finished cellulose product.

5. A method according to claim 1, wherein the forming pressure ($P_1$) is an isostatic pressure.

6. A method according to claim 1, wherein the heating of the cellulose blank at least partly takes place before pressing the cellulose blank.

7. A method according to claim 1, wherein the dry forming unit comprises a separating unit, a forming wire and a compacting unit, the method further comprising the steps:
separating cellulose into detached cellulose fibres in the separating unit;
arranging the cellulose fibres onto the forming wire; and
compacting the cellulose fibres in the compacting unit to form the cellulose blank.

8. A method according to claim 7, further comprising the step:
applying a sizing agent to the cellulose fibres to increase the hydrophobic properties and/or mechanical strength of the cellulose blank.

9. A method according to claim 1, wherein the cellulose blank is formed as a continuous cellulose web in the dry forming unit.

10. A method according to claim 9, wherein the continuous cellulose web is intermittently fed to the forming mould by a feeding unit.

11. A cellulose product forming apparatus for manufacturing a cellulose product having an essentially non-flat shape, the cellulose product forming apparatus comprising:
a dry forming unit for forming a cellulose blank;
a forming mould for forming the cellulose product comprising a stiff forming mould part and a multi-use membrane;
a positive stiff forming mould part and a negative stiff pressure mould part, wherein the multi-use membrane is a pre shaped non-flat membrane,
and wherein a shape of the multi-use membrane in a natural state corresponds to the shape of the negative and/or positive stiff forming mould part
wherein the cellulose product forming apparatus is configured to implement the method according to claim 1.

12. The cellulose product forming apparatus according to claim 11, further comprising a fluid control device for controllable allowing pressurized fluid to enter a pressure chamber having the flexible membrane as a portion of a wall thereof.

13. The cellulose product forming apparatus according claim 12,
wherein the fluid control device is an actuator compressing the pressure media or fluid, and
wherein the cellulose product forming apparatus comprises the pressure media or fluid, or wherein the pressure media is air taken from the surrounding atmosphere.

14. The cellulose product forming apparatus according to claim 11, wherein the cellulose product forming apparatus is configured to return to its open state by lowering the pressure media to atmospheric pressure, such that the membrane will retract to a more or less flat initial state and enabling ejection of the finished cellulose product.

15. The product forming apparatus according to claim 11, wherein the cellulose product forming apparatus is arranged to exert an isostatic forming pressure ($P_1$).

16. The cellulose product forming apparatus according claim 11,
wherein the dry forming unit comprises:
a separating unit for separating cellulose into detached cellulose fibres;
a forming wire for the cellulose fibres; and
a compacting unit for compacting the cellulose fibres to form the cellulose blank.

17. The cellulose product forming apparatus according to claim 11,
wherein sizing agents or other substances are applied to the cellulose fibres by an application unit.

18. The cellulose product forming apparatus according to claim 11,
wherein the dry forming unit is forming the cellulose blank as a continuous cellulose web.

19. The cellulose product forming apparatus according to claim 18,
wherein the continuous cellulose web is intermittently fed to the forming mould by a feeding unit.

20. The cellulose product manufactured by the method according to claim 1.

21. The cellulose product according to claim 20,
wherein the cellulose product comprises at least 90 weight percent cellulose fibres.

* * * * *